US011981135B2

(12) United States Patent
Aoyama

(10) Patent No.: US 11,981,135 B2
(45) Date of Patent: May 14, 2024

(54) LIQUID DISCHARGE HEAD, LIQUID DISCHARGE DEVICE, LIQUID DISCHARGE APPARATUS, AND METHOD FOR MANUFACTURING LIQUID DISCHARGE HEAD

(71) Applicant: Tsutoh Aoyama, Kanagawa (JP)

(72) Inventor: Tsutoh Aoyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 127 days.

(21) Appl. No.: 17/867,695

(22) Filed: Jul. 19, 2022

(65) Prior Publication Data

US 2023/0037253 A1 Feb. 2, 2023

(30) Foreign Application Priority Data

Jul. 27, 2021 (JP) ................................ 2021-122625

(51) Int. Cl.
*B41J 2/14* (2006.01)
*B41J 2/16* (2006.01)

(52) U.S. Cl.
CPC ............ *B41J 2/1433* (2013.01); *B41J 2/162* (2013.01); *B41J 2/1626* (2013.01)

(58) Field of Classification Search
CPC ......... B41J 2/1433; B41J 2/162; B41J 2/1626
See application file for complete search history.

(56) References Cited

U.S. PATENT DOCUMENTS

2014/0071203 A1* 3/2014 Kimura .................. B41J 2/1606
347/45
2015/0022592 A1 1/2015 Aoyama et al.
2015/0070444 A1 3/2015 Ishimori et al.
2016/0099402 A1 4/2016 Mizukami et al.
2019/0270310 A1 9/2019 Masuda et al.

FOREIGN PATENT DOCUMENTS

JP 2016-072571 5/2016
JP 2017-149120 8/2017
JP 2018-051833 4/2018

* cited by examiner

*Primary Examiner* — Thinh H Nguyen
(74) *Attorney, Agent, or Firm* — XSENSUS LLP

(57) ABSTRACT

A liquid discharge head includes: a nozzle plate having a nozzle from which a liquid is to be discharged in a discharge direction, the nozzle having a cylindrical hole having periodical convex portions and concave portions on a sidewall of the nozzle in the discharge direction, a diameter of an outermost portion of the nozzle in the discharge direction being smaller than an average diameter of minimum values and maximum values of diameters of the cylindrical shape. The average diameter is obtained by: Average diameter=(Sum of minimum values+Sum of maximum values)/(Count of minimum values+Count of maximum values).

10 Claims, 20 Drawing Sheets

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

LIQUID DISCHARGE HEAD, LIQUID DISCHARGE DEVICE, LIQUID DISCHARGE APPARATUS, AND METHOD FOR MANUFACTURING LIQUID DISCHARGE HEAD

CROSS-REFERENCE TO RELATED APPLICATIONS

This patent application is based on and claims priority pursuant to 35 U.S.C. § 119(a) to Japanese Patent Application No. 2021-122625, filed on Jul. 27, 2021, in the Japan Patent Office, the entire disclosure of which is incorporated by reference herein.

BACKGROUND

Technical Field

The present embodiment relates to a liquid discharge head, a liquid discharge device, a liquid discharge apparatus, and a method for manufacturing a liquid discharge head.

Description of the Related Art

In nozzle plates of inkjet heads, a technique to perform processing by dry etching using the Bosch process is known. In the technology mentioned above, patterning is performed on front and back sides of a silicon substrate, and the silicon substrate is processed by dry etching. The nozzle plate is manufactured by making the front and back sides communicate with each other.

SUMMARY

A liquid discharge head includes: a nozzle plate having a nozzle from which a liquid is to be discharged in a discharge direction, the nozzle having a cylindrical hole having periodical convex portions and concave portions on a sidewall of the nozzle in the discharge direction, a diameter of an outermost portion of the nozzle in the discharge direction being smaller than an average diameter of minimum values and maximum values of diameters of the cylindrical shape. The average diameter is obtained by: Average diameter=(Sum of minimum values+Sum of maximum values)/(Count of minimum values+Count of maximum values).

A liquid discharge device includes the liquid discharge head.

A liquid discharge apparatus includes the liquid discharge device.

A method for manufacturing a liquid discharge head configured to discharge a liquid from a nozzle in a discharge direction includes forming a deposition film on a substrate, the deposition film configured to protect the substrate, and etching the substrate and the deposition film formed on the substrate after forming the deposition film; repeating the forming and the etching to form a cylindrical hole having periodical convex portions and concave portions on a sidewall of the cylindrical hole in the discharge direction.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1A:
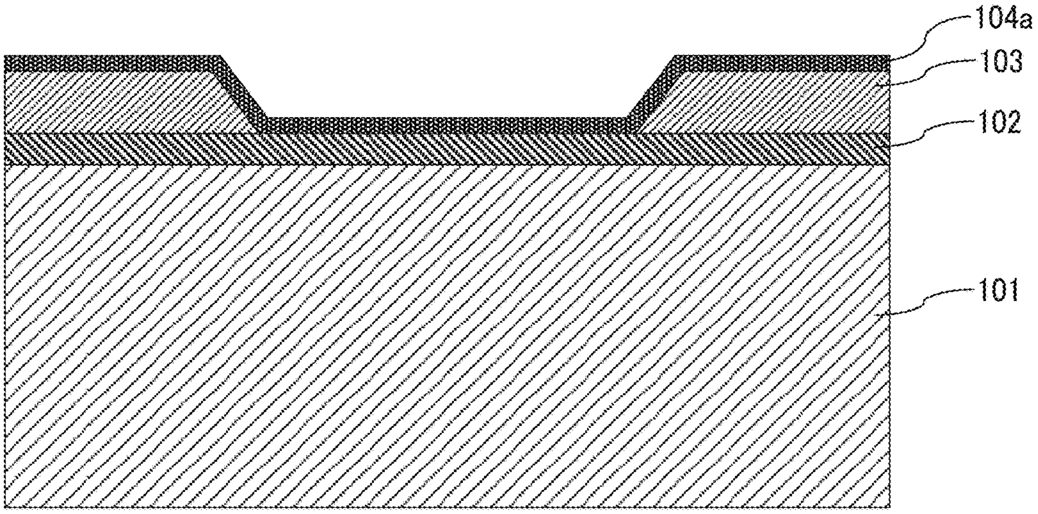
FIGS. 1A to 1C are schematic cross-sectional views of an example of a manufacturing method of the present embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

A liquid discharge head, a liquid discharge device, a liquid discharge apparatus, and a method for manufacturing a liquid discharge head according to the present embodiment are described below with reference to the drawings. The present embodiments are not limited to the embodiments described below, and changes, such as other embodiments, addition, modification, and deletion, can be made within the range conceivable by a person skilled in the art. Any mode is to be included within the scope of the present embodiments as long as the mode can achieve the effect and advantage of the present embodiments.

A liquid discharge head of the present embodiment pertains to a liquid discharge head provided with a nozzle plate including a nozzle, in which: the nozzle has, relative to a thickness direction of the nozzle plate, at least one cylindrical shape configuration having periodic projections (convex portions) and depressions (concave portions) formed on a sidewall of the cylindrical shape (cylindrical hole) configuration; and a diameter of an outermost portion of the nozzle, in the cylindrical shape configuration on a liquid discharge surface side, is smaller than an average diameter of minimum values and maximum values of diameters of the cylindrical shape configuration defined by Expression (1).

[Average Diameter of Minimum Values and Maximum Values of Diameters of Cylindrical Shape Configuration]

$$\text{Average diameter}=(\text{Sum(sum value) of minimum values}+\text{Sum(sum value) of maximum values})/(\text{Count of minimum values}+\text{Count of maximum values}) \quad (1)$$

A method for manufacturing a liquid discharge head of the present embodiment pertains to a method for manufacturing a liquid discharge head provided with a nozzle plate including a nozzle, the method including: employing a Bosch process including an etching process, which is to etch at least one of a substrate and a deposition film, and a deposition film formation process, which is to form a deposition film to protect the substrate, to form the nozzle plate; and performing the deposition film formation process prior to performing the etching process of a first time, in which: the nozzle has, relative to a thickness direction of the nozzle plate, at least one cylindrical shape configuration having periodic projections and depressions formed on a sidewall of the cylindrical shape configuration; and a diameter of an outermost portion of the nozzle, in the cylindrical shape configuration on a liquid discharge surface side, is made smaller than an average diameter of minimum values and maximum values of diameters of the cylindrical shape configuration defined by Expression (1).

[Average Diameter of Minimum Values and Maximum Values of Diameters of Cylindrical Shape Configuration]

$$\text{Average diameter}=(\text{Sum value of minimum values}+\text{Sum value of maximum values})/(\text{Count of minimum values}+\text{Count of maximum values}) \quad (1)$$

According to the present embodiment, it is possible to improve diameter uniformity at a nozzle outermost portion in a nozzle plate. In the present embodiment, it is possible to control the shape of a hole of a nozzle on a liquid discharge surface, and improve dimensional uniformity.

Further, in the present embodiment, a liquid discharge device provided with the liquid discharge head of the present embodiment, and a liquid discharge apparatus provided with the liquid discharge device or the liquid discharge head of the present embodiment are provided. An inkjet head, for example, is provided as an embodiment of the liquid discharge head of the present embodiment, and an inkjet recording device, for example, is provided as an embodiment of the liquid discharge apparatus of the present embodiment.

The inkjet recording device has many advantages, such as that the noise of the device is extremely small and high-speed printing is possible, as well as that the device has flexibility in the ink to be used, and the device can use inexpensive plain paper. For this reason, the inkjet recording devices are widely deployed as image recording devices or image forming devices such as printers, facsimiles, and copiers.

The liquid discharge head is formed of, for example, an electromechanical transducer element such as a piezoelectric element, an electrothermal transducer element such as a heater, a pressurizing chamber (also referred to as an ink channel, a pressurized liquid chamber, a pressure chamber, a discharge chamber, or a liquid chamber) opposed to the transducer element, and a nozzle communicating with the pressurizing chamber. In such a liquid discharge head, the pressurizing chamber is filled with liquid (e.g., ink), and pressure is generated in the pressurizing chamber by the piezoelectric element and the heater mentioned above to discharge the liquid from the nozzle communicating with the pressurizing chamber. The liquid discharge head of the present embodiment is provided with a nozzle plate including a nozzle.

What is most important as the performance of a liquid discharge head is to make ink droplets land at a desired position. To achieve the above, the requirements are, for example, a nozzle is oriented perpendicular to an object to be discharged, a nozzle edge is a perfect circle, and nozzle diameters are uniform.

If the nozzle is not perpendicular to the object to be discharged, it is not difficult to imagine that an ink landing position will shift. If the nozzle edge is not a perfect circle and has protrusions or burrs, droplets will be deflected with the point of protrusions or burrs being the starting point of the deflection, and the ink landing position accuracy will be lowered. If the nozzle diameters are not uniform and vary, fluid resistance will be changed for each nozzle, and the speed of droplets to be discharged will be changed. As a printing mechanism, an inkjet head moves or a print target (a recording medium) moves, so if the speed of droplets to be discharged changes, the ink landing position also changes.

Examples of a method of nozzle production include a press method of making a hole in a metal plate by pressing, and a dry etching method of making a hole by etching a silicon (Si) substrate. In the former method, shape control is difficult, and also, burrs are likely to be produced at a nozzle edge and a problem in which droplets are deflected is likely to arise. Thus, the latter method, i.e., a dry etching method by the Bosch process, is mainly employed in light of the high controllability of the shape.

While the degree of a perfect circle obtained by the processing can be improved by dry etching, improving the uniformity of the nozzle diameters is difficult in either the press method or the dry etching method. As for making the nozzle diameters uniform, in the dry etching method, it is necessary to precisely control a finished shape of a nozzle edge on the side at which liquid is discharged.

The Bosch process, which is a type of the dry etching method, executes an etching process to etch at least one of a substrate and a deposition film, and a deposition film formation process to form a deposition film to protect the substrate. In the Bosch process, silicon (Si) is processed vertically by alternately performing the etching process and the deposition film formation process. The Bosch process enables dimensional controllability to be enhanced, and vertical processing can also be performed easily.

The aforementioned etching process can be divided into two steps.

The two steps are a deposition removal step of increasing a bias of an electrode and making ions collide with a wafer and removing a deposition film, and an isotropic etching step of chemically etching Si without applying a voltage. In the etching process, the deposition removal step and the isotropic etching step are performed in order. The names of the steps may be changed as appropriate.

Note that in the deposition removal step, Si is also etched by excess energy that remains after the deposition film has been removed.

The Si substrate to be etched is patterned with a resist, and usually includes a thin natural oxide film on a surface.

Since the deposition film protects a sidewall when performing vertical processing, the deposition film may be referred to as a sidewall protective film.

Figure 23:
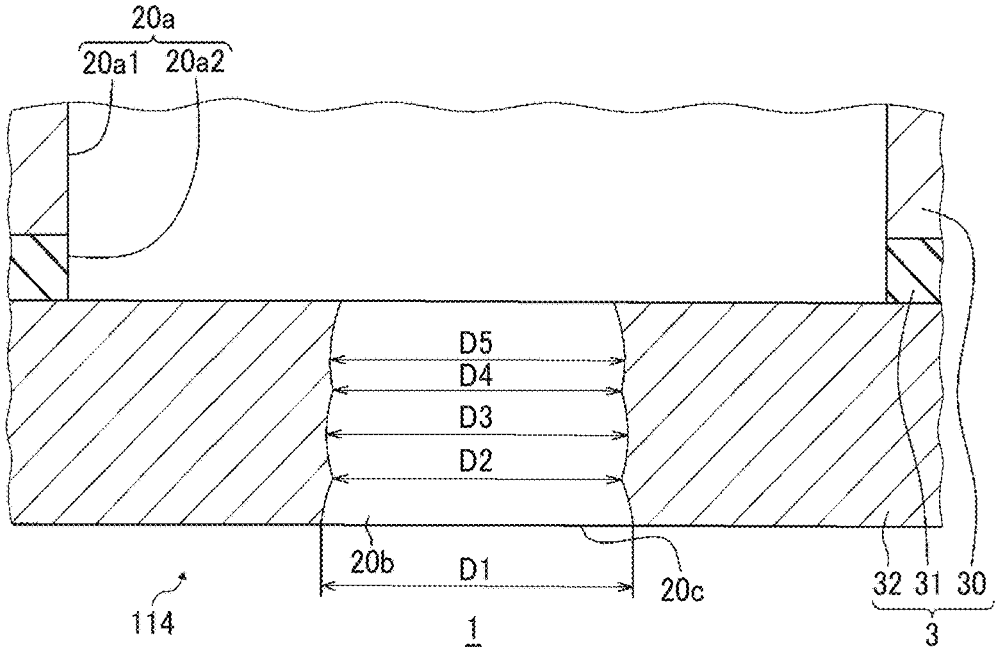
FIG. 23 is a schematic cross-sectional view of a nozzle in the comparative example.

Before describing the details of the present embodiment, a comparative example is first described by referring to FIG. 20 (20A to 20C) to FIG. 23.

First, as an overview, in the comparative example, after performing an initial etching process for a start, a deposition film formation process is performed, and then the etching process and the deposition film formation process are performed alternately. In this case, in a starting step, a resist is also etched when etching a natural oxide film. Thus, after processing, uniformity of nozzle dimensions in a wafer surface is lowered. In addition, since Si is etched after the natural oxide film has been etched in a deposition removal step, the shapes to be obtained in the first cycle are varied within the wafer surface if etching gas to be applied is not uniform.

A manufacturing method of the comparative example is described by referring to the drawing. In the comparative example, an etching process is performed first.

Figure 20A:
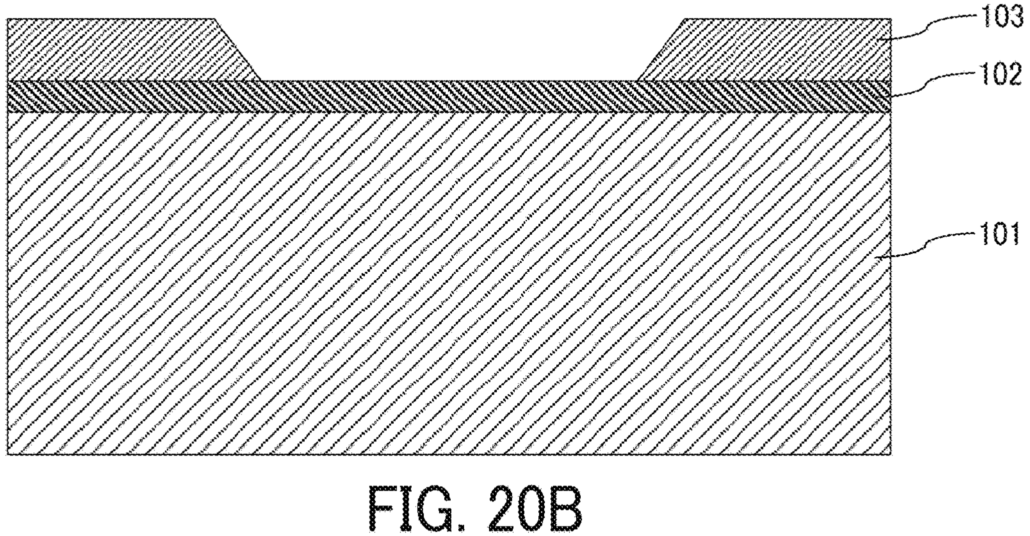
FIGS. 20A to 20C are schematic cross-sectional views of a manufacturing method of a comparative example.

FIG. 20A presents the state of before performing the initial etching process. A natural oxide film 102 is formed on a surface of a Si substrate 101, and a resist 103 is formed on the natural oxide film 102.

Figure 20B:
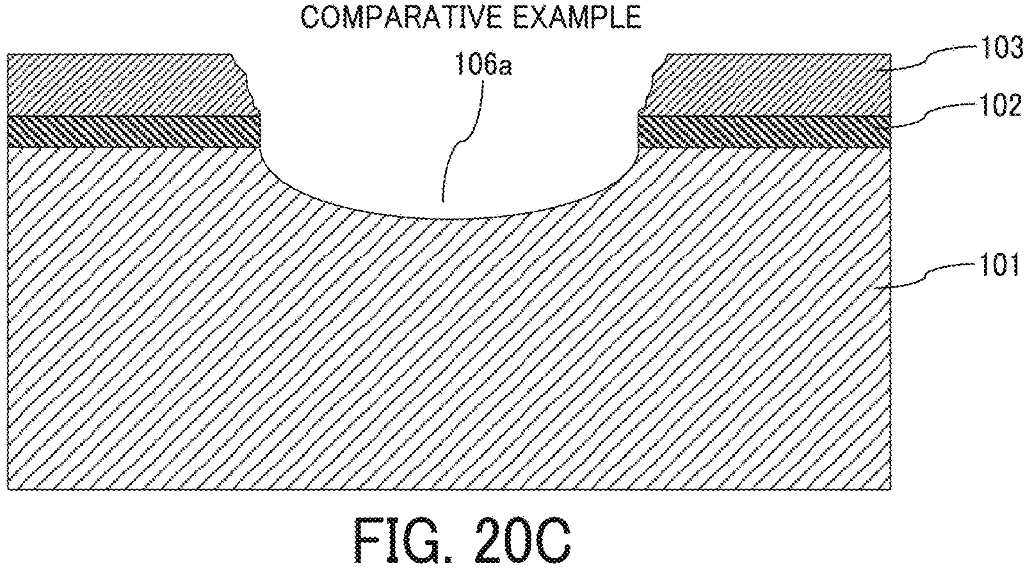

FIG. 20B illustrates the state of after performing a deposition removal step in the initial etching process. By the deposition removal step, the natural oxide film 102 is etched. However, with the etching of the natural oxide film 102, the resist 103 is also etched. The figure schematically illustrates that the resist 103 is etched. Since the resist is etched, uniformity of the nozzle dimensions in the wafer surface is lowered.

Figure 20C:
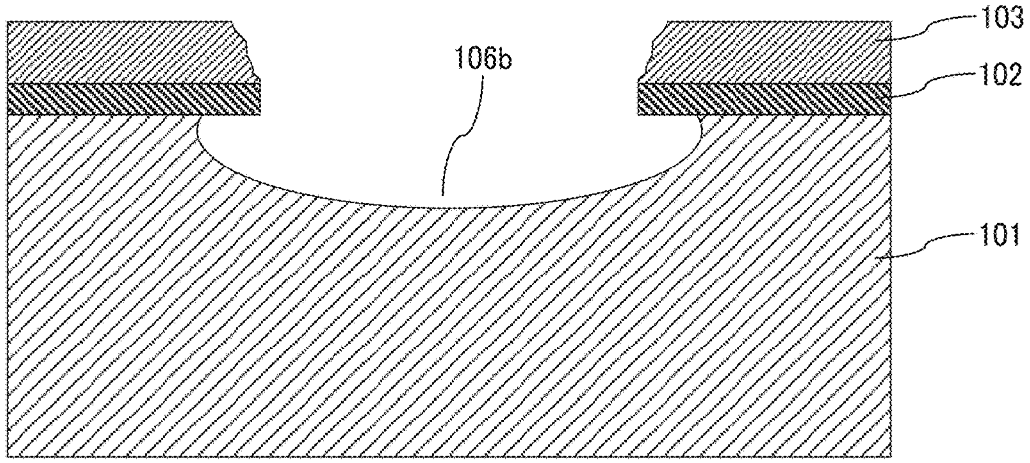

As indicated in FIG. 20C, in the deposition removal step, the Si substrate 101 is etched by excess energy that remains after removal of the natural oxide film 102. In the Si substrate 101, a part which has been etched at this time is indicated by reference numeral 106*a*.

FIG. 20C illustrates the state of after performing an isotropic etching step in the initial etching process. As illustrated by the drawing, the Si substrate 101 is etched. In the Si substrate 101, a part which has been etched at this time is indicated by reference numeral 106*b*.

Then, a deposition film formation process is performed.

Figure 21A:
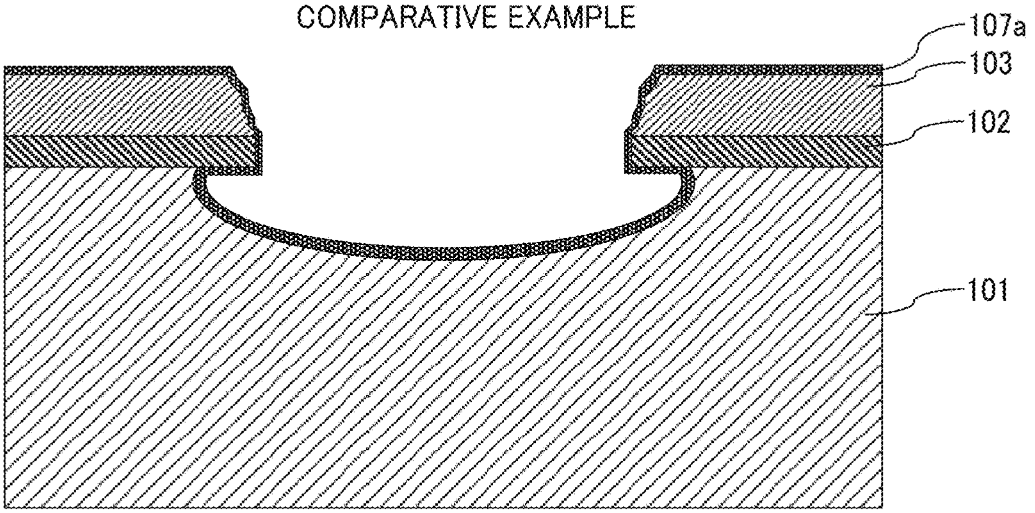
FIGS. 21A to 21C are schematic cross-sectional views of the manufacturing method of the comparative example.

FIG. 21A illustrates the state of after forming a deposition film 107*a* on the Si substrate 101. The deposition film 107*a* is formed on the resist 103 and on the etched part (indicated by reference numeral 106*b*) in the Si substrate 101.

Then, the second etching process is performed.

Figure 21B:
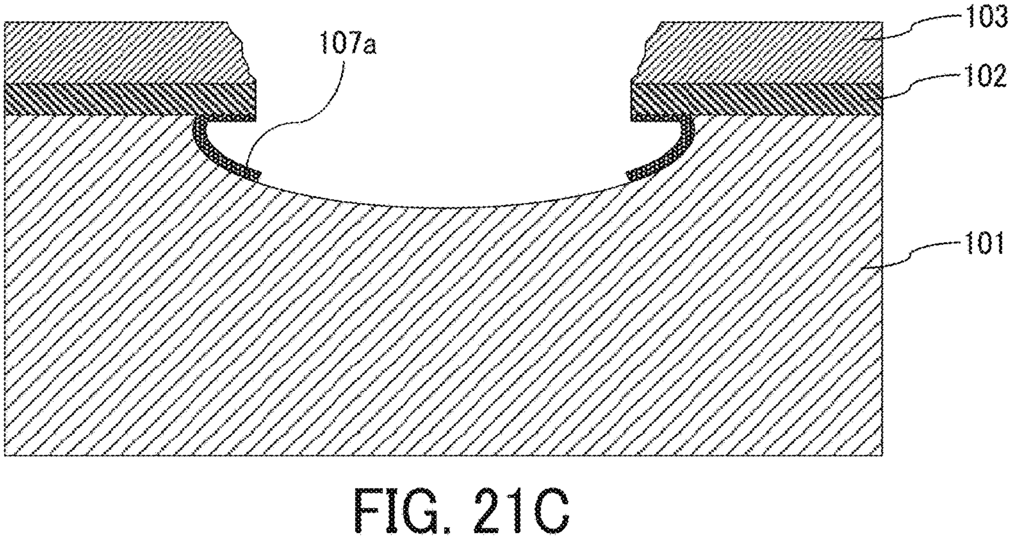

FIG. 21B illustrates the state of after performing a deposition removal step in the etching process. As etching is performed for a predetermined time, a bottom portion of the deposition film 107*a* is removed.

Figure 21C:
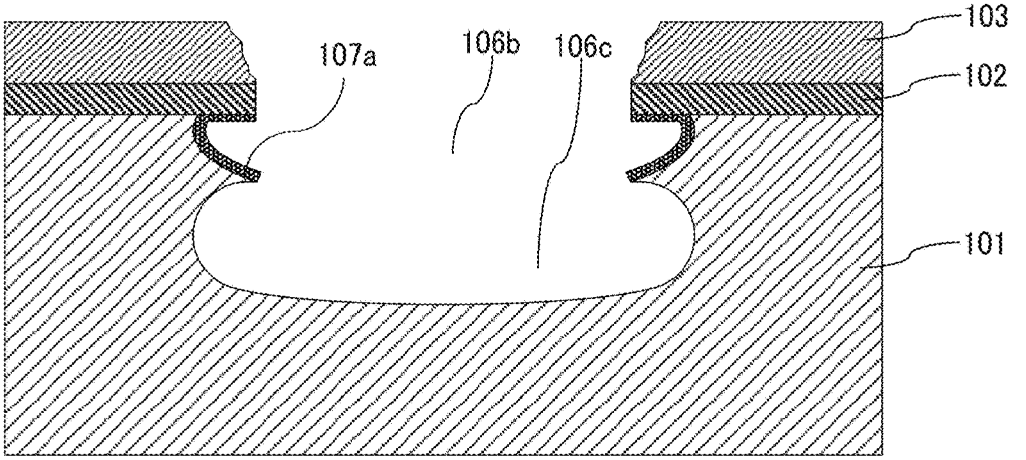

FIG. 21C illustrates the state of after performing an isotropic etching step in the etching process. As illustrated by the drawing, the Si substrate 101 is etched. In the Si substrate 101, a part which has been etched at this time is indicated by reference numeral 106*c*. As illustrated by the drawing, at this stage, the Si substrate 101 is etched as indicated by reference numerals 106*b* and 106*c*.

Thereafter, the deposition film formation process and etching process are performed repeatedly.

Figure 22:
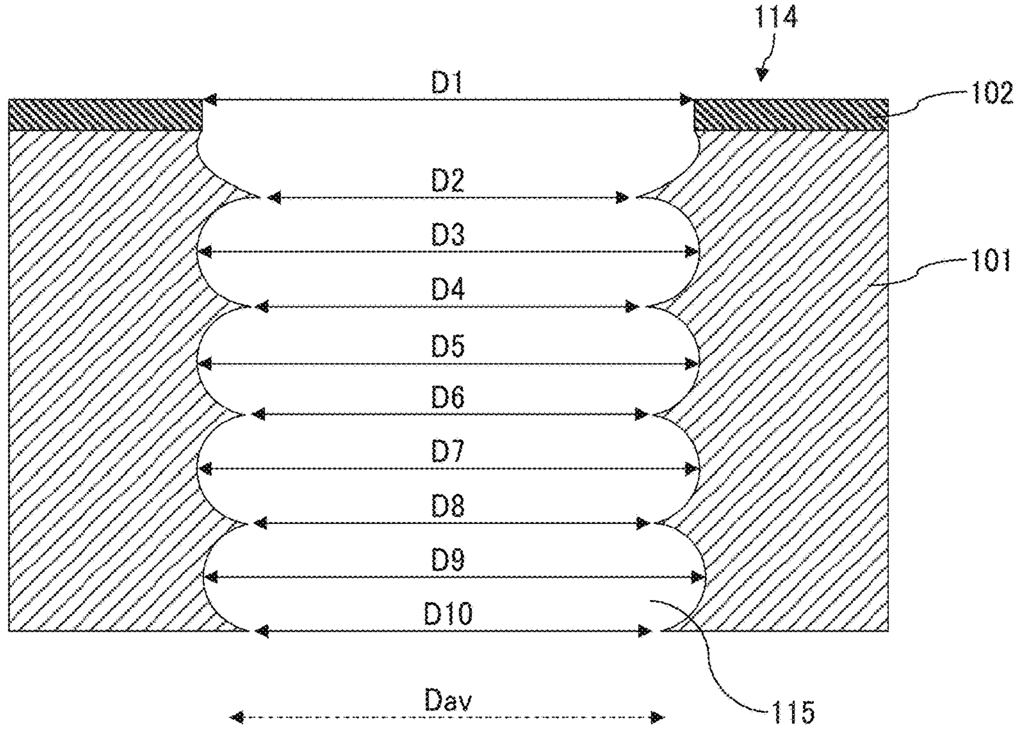
FIG. 22 is a schematic cross-sectional view of a nozzle in the comparative example.

FIG. 22 illustrates a nozzle 115 of a comparative example formed as described above. In the drawing, reference numeral 114 indicates a liquid discharge surface. Further, D1 indicates the diameter of an outermost portion of the nozzle 115. Furthermore, D2, D4, D6, D8, and D10 indicate minimum values of the diameters of a cylindrical shape configuration included in the nozzle, and D3, D5, D7, and D9 indicate maximum values of the diameters of the cylindrical shape configuration.

Though details are described later, the diameter D1 of the outermost portion of the nozzle 115 is greater than an average diameter Day of the minimum values and the maximum values of the diameters of the cylindrical shape configuration. The above is caused by the fact that the resist 103 has been etched in the initial etching process. Also, in the comparative example, uniformity of the nozzles in the wafer surface is lowered, and the diameters D1 of the outermost portions are varied.

FIG. 23 is a cross sectional view of a nozzle formed according to a comparative example 1. A diameter D1 of a nozzle outermost portion is greater than the average diameter of minimum values and maximum values in a cylindrical shape configuration of the nozzle.

Figure 1B:
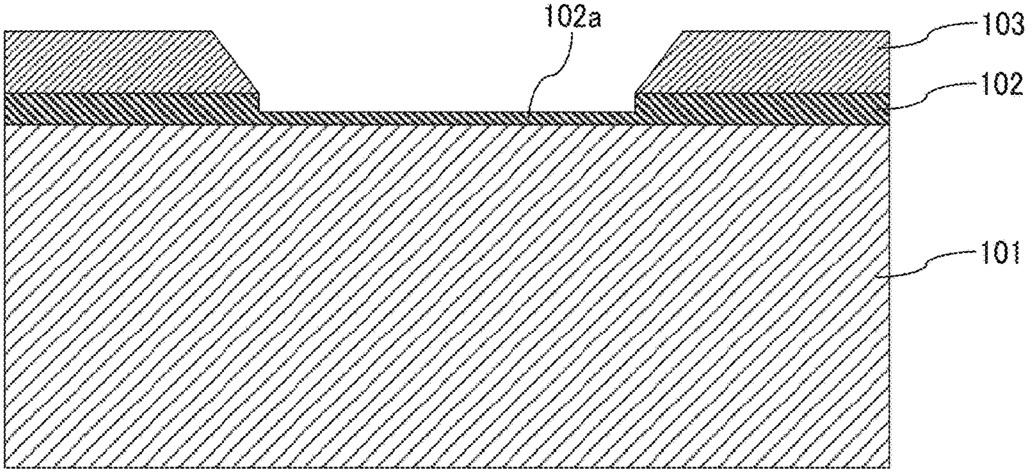
Figure 1C:
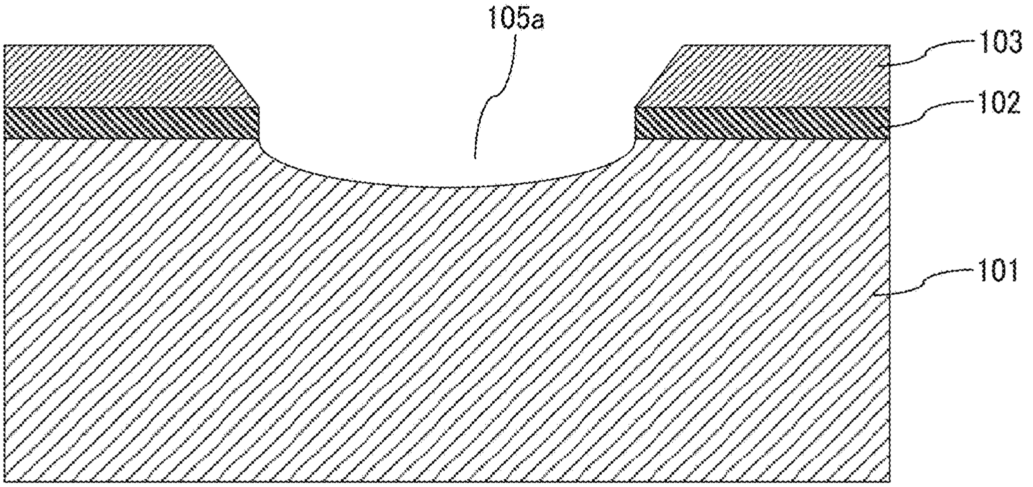
Figure 3A:
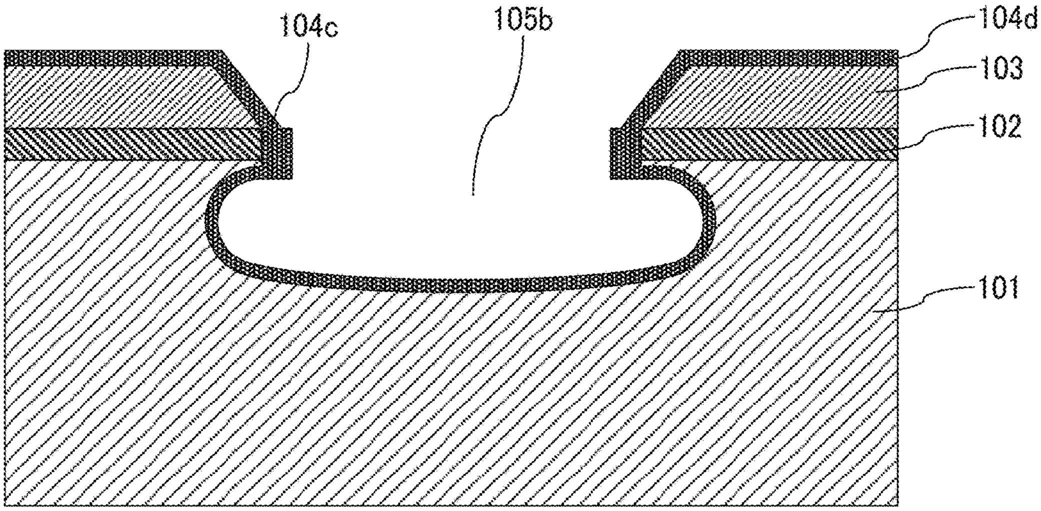
FIGS. 3A to 3C are schematic cross-sectional views of an example of the manufacturing method of the present embodiment.
Figure 3B:
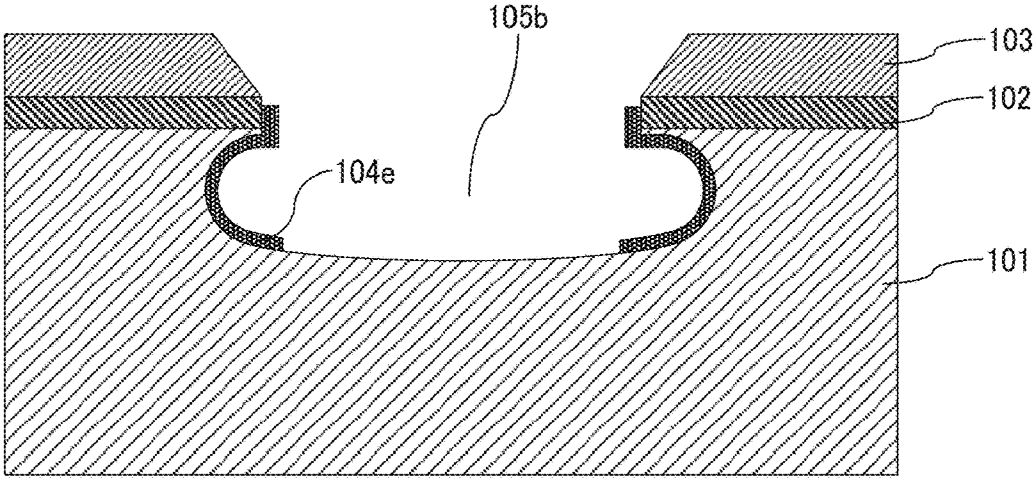
Figure 3C:
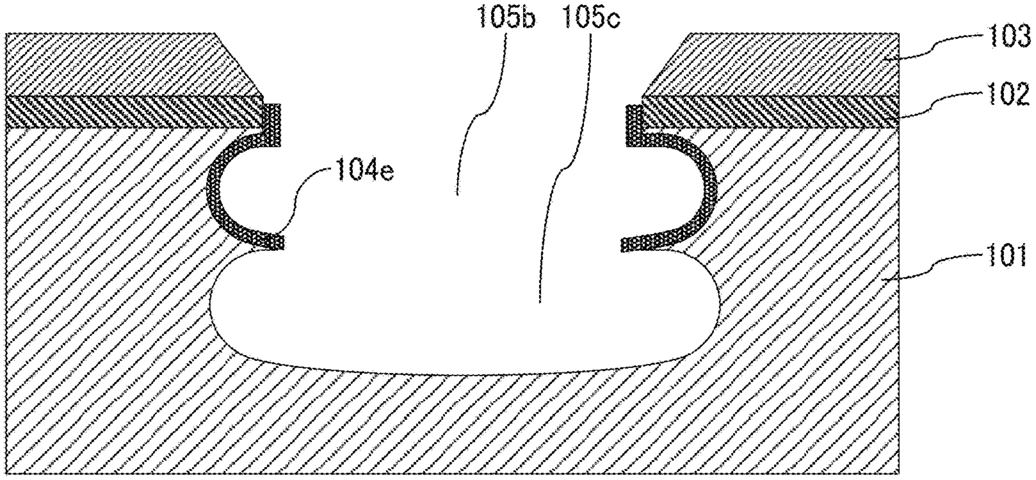

Next, one embodiment of the illustrate embodiment is described by referring to FIG. 1 (FIGS. 1A to 1C) to FIG. 3(FIGS. 3A to 3C), etc.

To first describe an overview, in the illustrate embodiment, in forming a nozzle plate by the Bosch process, a deposition film formation process is performed prior to performing an initial etching process. By virtue of this feature, it is possible to suppress a resist loss during the initial etching process, and thus lowering of the uniformity of the nozzle dimensions can be suppressed. Further, in the initial etching process, Si is etched by isotropic etching after removing a natural oxide film by excess energy of a deposition removal process. Accordingly, the shapes to be obtained in the first cycle can be made the same within the wafer surface, and it is possible to improve the uniformity of the nozzle shape.

First, the deposition film formation process is performed prior to performing the initial etching process.

FIG. 1A illustrates the state of before performing the initial etching process, in other words, the state of after performing the deposition film formation process. A natural oxide film 102 is formed on a surface of a Si substrate 101 (substrate), and a resist 103 is formed on the natural oxide film 102. Furthermore, as the deposition film formation process is performed, a deposition film 104*a* is formed on the resist 103 and on the natural oxide film 102.

Since the deposition film protects a sidewall when performing vertical processing, the deposition film may be referred to as a sidewall protective film. Further, in the illustrate embodiment, a material of the deposition film and a method for forming the same are not particularly limited, and can be selected as appropriate.

Then, the initial etching process is performed.

FIG. 1B illustrates the state of after performing a deposition removal step in the initial etching process. As illustrated by the drawing, the deposition film 104*a* is removed. Also, in the illustrate embodiment, in the deposition removal step of the initial etching process, a part of the natural oxide film 102 is removed by the excess energy that remains in removing the deposition film 104*a*. In the drawing, reference numeral 102*a* indicates a part of the natural oxide film 102 remaining after the deposition removal step.

FIG. 1C illustrates the state of after performing an isotropic etching step in the initial etching process. By the isotropic etching step, a part of the natural oxide film 102 (indicated by reference numeral 102*a*) is etched, and moreover, the Si substrate 101 is etched. In the Si substrate 101, a part which has been etched at this stage is indicated by reference numeral 105*a*.

As can be seen by comparing FIG. 20B corresponding to the comparative example with view FIG. 1B of the illustrate embodiment, a loss of the resist 103 can be suppressed in the initial etching process. Accordingly, it is possible to suppress variations in the shapes (diameters) of a nozzle outermost portion in a wafer.

Also, as can be seen by comparing FIG. 20C corresponding to the comparative example with FIG. 1C of the illustrate embodiment, it is possible to suppress excessive etching of the Si substrate 101 in the isotropic etching step in the initial etching process. Accordingly, it is possible to prevent the diameter of the nozzle outermost portion from being larger than the intended size, and dimensional uniformity can be improved.

Thereafter, the deposition film formation process and etching process are performed repeatedly.

Figure 2A:
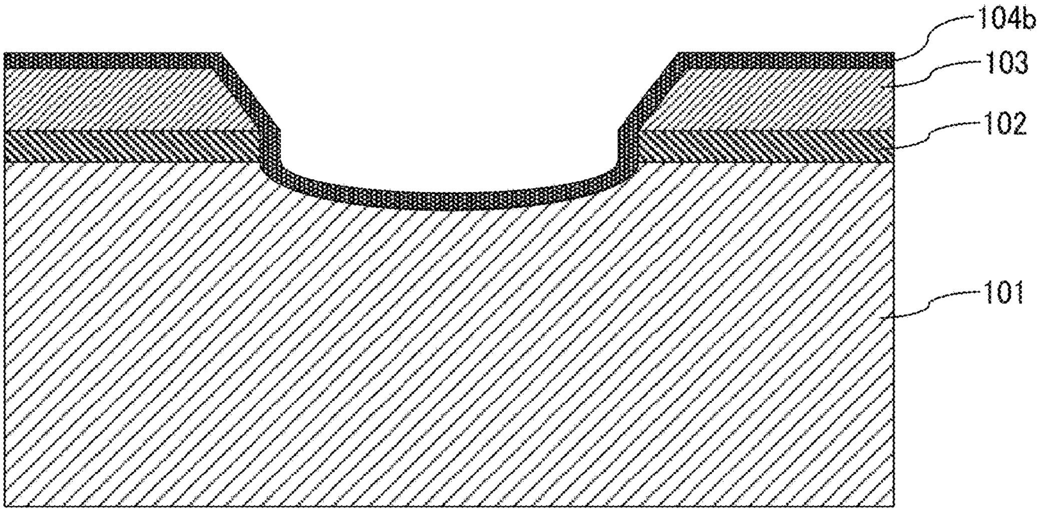
FIGS. 2A to 2C are schematic cross-sectional views of an example of the manufacturing method of the present embodiment.

FIG. 2A illustrates the state of after performing the second deposition film formation process. More specifically, FIG. 2A illustrates the state of after forming a deposition film 104*b* on the Si substrate 101 and the resist 103.

Then, the second etching process is performed.

Figure 2B:
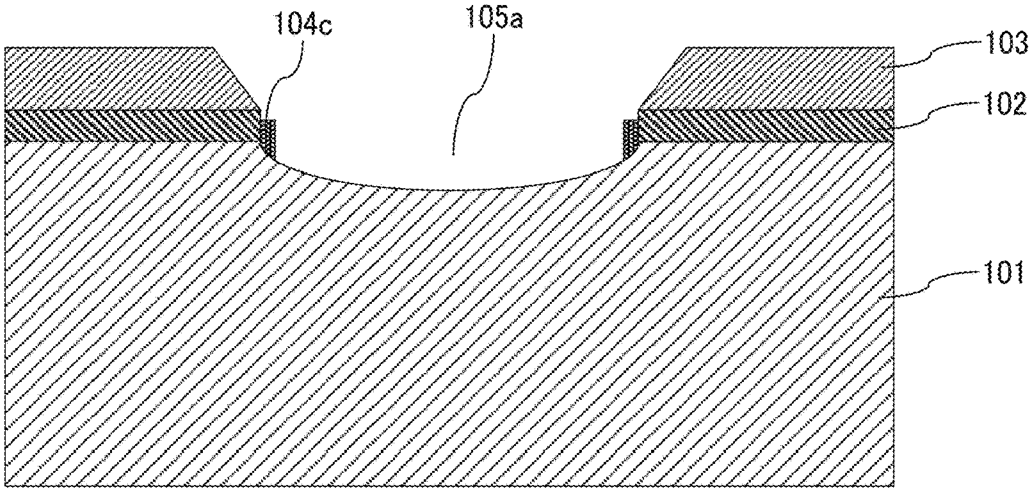

FIG. 2B illustrates the state of after performing a deposition removal step in the etching process. As etching is performed for a predetermined time, the deposition film 104*b* is removed.

As illustrated by the drawing, after performing the deposition removal step of the second etching process, a part of the deposition film 104*b* is left unremoved. In the drawing, a part of the deposition film 104*b* left unremoved is indicated by reference numeral 104*c* (deposition film 104*c*). In removing the deposition film 104*b*, the deposition film is removed vertically (e.g., from top to bottom on the plane of paper of the drawing), for example.

Therefore, since the part corresponding to reference numeral 104*c* (deposition film 104*c*) is long in a removal direction, a part of the deposition film 104 is to be left unremoved. However, in the present embodiment, as will be described later, the unremoved deposition film 104 (i.e., the deposition film 104*c*) does not affect the other processes such as the subsequent isotropic etching step and deposition film formation process.

Figure 2C:
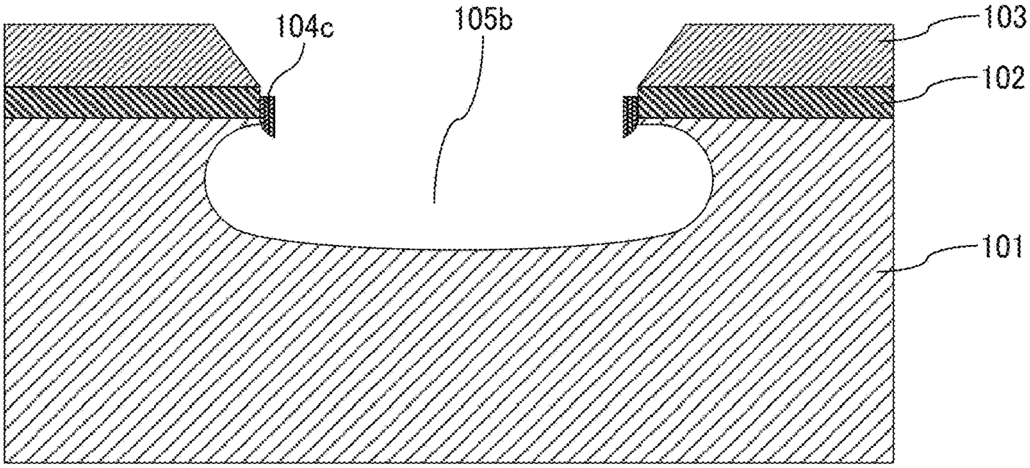

FIG. 2C illustrates the state of after performing an isotropic etching step in the etching process. As illustrated by the drawing, the Si substrate 101 is etched. In the Si substrate 101, an etched part 105*b* which has been removed at this time is indicated by reference numeral 105*b*.

FIG. 3A illustrates the state of after performing the next deposition film formation process. More specifically, view (g) of FIG. 3A illustrates the state of after forming a deposition film 104*d* on the Si substrate 101. Apart from on the resist 103, the deposition film 104*d* is formed on the etched part 105*b* (indicated by reference numeral 105*b*) in the Si substrate 101.

In the deposition film formation process at this time, if the deposition film 104*d* is further formed on the part (deposition film 104*c*) where the deposition film is partially left unremoved in the previous deposition removal step, a thickness of the left portion is added, and the thickness of the deposition film is increased. Although the thickness is increased, since a desired portion is removed in the subsequent deposition removal step, the left part (deposition film 104*c*) does not much affect the process.

Then, the next etching process is performed.

FIG. 3B illustrates the state of after performing a deposition removal step in the etching process. As etching is performed for a predetermined time, the deposition film 104*d* is removed. By the above removal, a part on the resist 103 and a part at a bottom surface of the deposition film 104*d* are mainly removed, and a deposition film 104*e* is left to be illustrate. As illustrated by the drawing, even if there is a portion where the thickness of the deposition film is increased, the deposition film of the desired portion is removed.

FIG. 3C illustrates the state of after performing an isotropic etching step in the etching process. As illustrated by the drawing, the Si substrate 101 is etched. In the Si substrate 101, a part which has been etched at this time is indicated by reference numeral 105*c*. As illustrated by the drawing, at this stage, the Si substrate 101 is etched as indicated by reference numerals 105*b* and 105*c* (etched parts 105*b* and 105*c*).

As illustrated by the drawing, since a sidewall of the etched part 105*b* (reference numeral 105*b*) is protected by the deposition film 104*e*, the deposition film may be referred to as a sidewall protective film, for example.

Thereafter, the deposition film formation process and the etching process are performed repeatedly in the same way as for the above, and a nozzle is thus formed. The number of times the processes are repeated is not particularly limited, and can be selected as appropriate. Further, after repeating the deposition film formation process and the etching process, the deposition film and the resist are removed by ashing treatment, for example.

In this way, the Si substrate can be processed vertically. By the process as described above, a nozzle having a cylindrical shape configuration is formed, and the sidewall of the cylindrical shape configuration has periodic projections and depressions.

Thus, the method for manufacturing the liquid discharge head (404) configured to discharge a liquid from the nozzle (121) in a discharge direction includes: forming a deposition film (104) on a substrate (101), the deposition film (104) configured to protect the substrate (101), etching the substrate (101) and the deposition film (104) formed on the substrate (101) after forming the deposition film (104); and repeating the forming and the etching to form a cylindrical hole (121) having periodical convex portions and concave portions on a sidewall of the cylindrical hole in the discharge direction.

Figure 4:
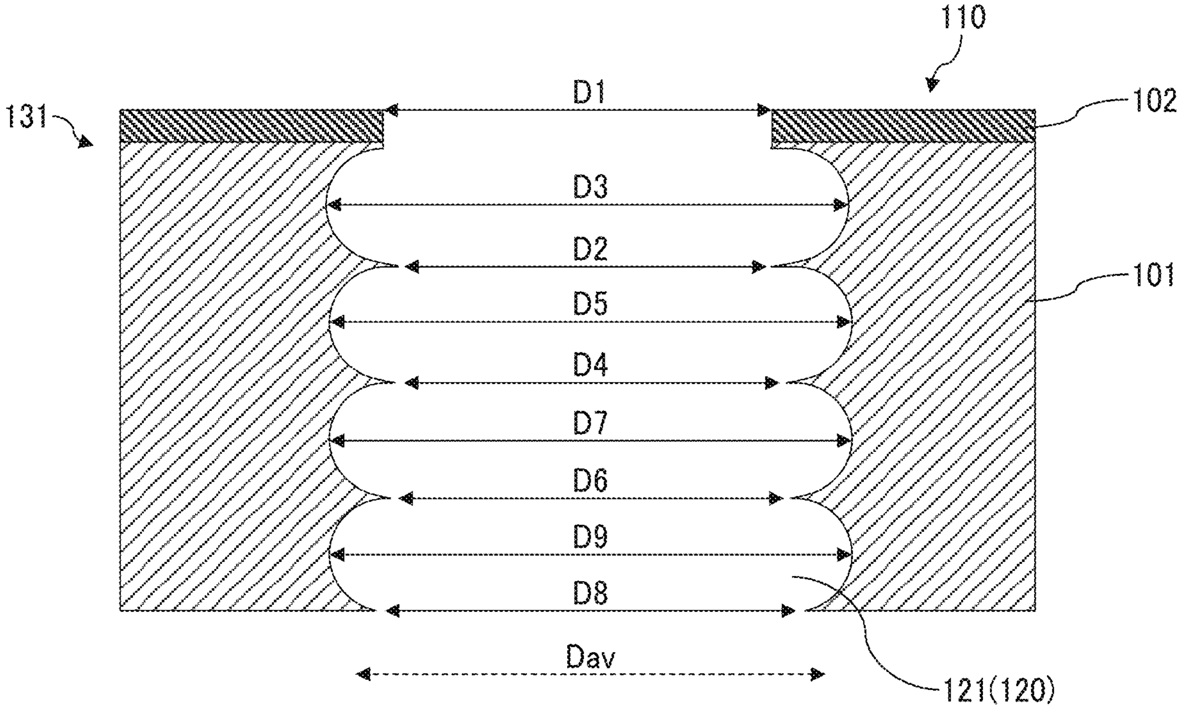
FIG. 4 is a schematic cross-sectional view of an example of a nozzle in the present embodiment.

An example of a nozzle obtained according to the present embodiment is illustrated in FIG. 4. In FIG. 4, the Si substrate 101, the natural oxide film 102, a liquid discharge surface 110, a nozzle 121, and a nozzle plate 131 are illustrated. Although not illustrated in the drawing, when the nozzle plate 131 is seen from above, the nozzle 121 has a circular opening, and incudes a cylindrical shape configuration. Further, although not illustrated in FIG. 4, the nozzle 121 communicates with a liquid chamber (pressurizing chamber).

Since the nozzle of the present example has one cylindrical shape configuration, the nozzle and the cylindrical shape configuration can be considered to be the same. Reference numeral 120 indicates the nozzle 120, and reference numeral 121 indicates the cylindrical shape configuration (cylindrical hole) or a first cylindrical shape configuration (first cylindrical hole 121). FIG. 4 indicates "121 (120)" for convenience to refer to the nozzle 121 and the cylindrical shape configuration (cylindrical hole) collectively. The following description of the present example uses the expression "nozzle 121", and the nozzle and the cylindrical shape configuration are described collectively.

In FIG. 4, D1 indicates the diameter of an outermost portion of the nozzle 121. Further, D2, D4, D6, and D8 indicate minimum values of the diameters of the cylindrical shape configuration included in the nozzle, and D3, D5, D7, and D9 indicate maximum values of the diameters of the cylindrical shape configuration. Day schematically indicates the average diameter of the minimum values and the maximum values.

In the present embodiment, the diameter D1 of the outermost portion of the nozzle 121 (i.e., the cylindrical shape configuration on the liquid discharge surface side) is smaller than the average diameter Day of the minimum values and the maximum values of the diameters of the cylindrical shape configuration as defined below.

[Average Diameter of Minimum Values and Maximum Values of Diameters of Cylindrical Shape Configuration]

Average diameter=(Sum value of minimum values+Sum value of maximum values)/(Count of minimum values+Count of maximum values)

When the above equation is applied to the example illustrated in FIG. 4, the average diameter is derived as indicated below.

$$Dav=((D2+D4+D6+D8)+(D3+D5+D7+D9))/(4+4)$$

The average diameter may be obtained by first calculating each of the average diameter of the minimum values and the average diameter of the maximum values, and then adding up the two average diameters and dividing the sum by two.

A liquid discharge head 404 includes: a nozzle plate 131 having a nozzle 121 from which a liquid is to be discharged in a discharge direction, the nozzle 121 having a cylindrical hole having periodical convex portions and concave portions on a sidewall of the nozzle in the discharge direction, a diameter of an outermost portion (D1) of the nozzle 121 in the discharge direction being smaller than an average diameter (Day) of minimum values and maximum values of diameters of the cylindrical holes (nozzle 121), wherein the average diameter is obtained by: Average diameter (Day)=(Sum of minimum values+Sum of maximum values)/(Count of minimum values+Count of maximum values).

Note that the above "Count of minimum values" need not be the count of all of the minimum values in the cylindrical shape configuration. That is, it is sufficient if some of the minimum values, such as the values of the measured points, for example, in the cylindrical shape configuration, are applied. Similarly, "Count of maximum values" need not be the count of all of the maximum values in the cylindrical shape configuration.

As described above, in the present embodiment, as the deposition film formation process is performed prior to performing the initial etching process, a resist loss can be suppressed. Accordingly, it is possible to improve diameter uniformity at a nozzle outermost portion in a nozzle plate. Further, since Si is etched by isotropic etching after removing the natural oxide film by the excess energy of the first deposition removal step, the shapes to be obtained in the first cycle become the same within the wafer surface, and the shape uniformity is improved.

As described above, the diameter of the outermost portion of a nozzle when the nozzle is formed in the order of the deposition film formation process, the etching process, and repetition of the processes (i.e., in the case of the present embodiment) becomes smaller than the diameter of the outermost portion of a nozzle when the nozzle is formed in the order of the etching process, the deposition film formation process, and repetition of the processes (i.e., in the case of the comparative example). The diameter being smaller as mentioned above owes to the fact that the nozzle has been successfully formed in a desired shape. As a result, the diameter of the outermost portion of the nozzle and the average diameter satisfy the above relationship.

In a nozzle plate including a nozzle in which the diameter of an outermost portion of the nozzle and the average diameter satisfy the above relationship, and a liquid discharge head including such a nozzle plate, it is possible to improve diameter uniformity at the nozzle outermost portion, and also improve uniformity of the nozzle dimensions. Accordingly, with the liquid discharge head of the present embodiment, it is possible to prevent such a disadvantage as a liquid discharge speed being varied due to non-uniformity of the nozzles, and the landing accuracy can be improved. In addition, with the liquid discharge head of the present embodiment, it is possible to suppress lowering of compatibility with a discharge waveform, and generation of mist can be suppressed.

As a method for measuring the diameter of the outermost portion of the nozzle, and the minimum values and maximum values of the diameters of the cylindrical shape configuration, the following is performed.

An optical automatic measuring instrument, which acquires an image under a microscope, and performs dimensional measurement for the acquired image by image processing, is used to obtain the diameter of the outermost portion of the nozzle.

The minimum values and maximum values of the diameters of the cylindrical shape configuration are obtained by acquiring a scanning electron microscope (SEM) image of a cross section of the nozzle, and measuring the diameter of the sidewall by SEM observation. The points of measurement of the minimum values and the maximum values, in other words, the number of points where the minimum values and the maximum values are obtained are 30 or so (i.e., 30 points for the minimum value and 30 points for the maximum value) per nozzle, for example.

In order for the diameter of the outermost portion of the nozzle and the average diameter to satisfy the above relationship, the deposition film formation process is to be performed prior to performing the initial etching process, as has been described above.

Figure 5A:
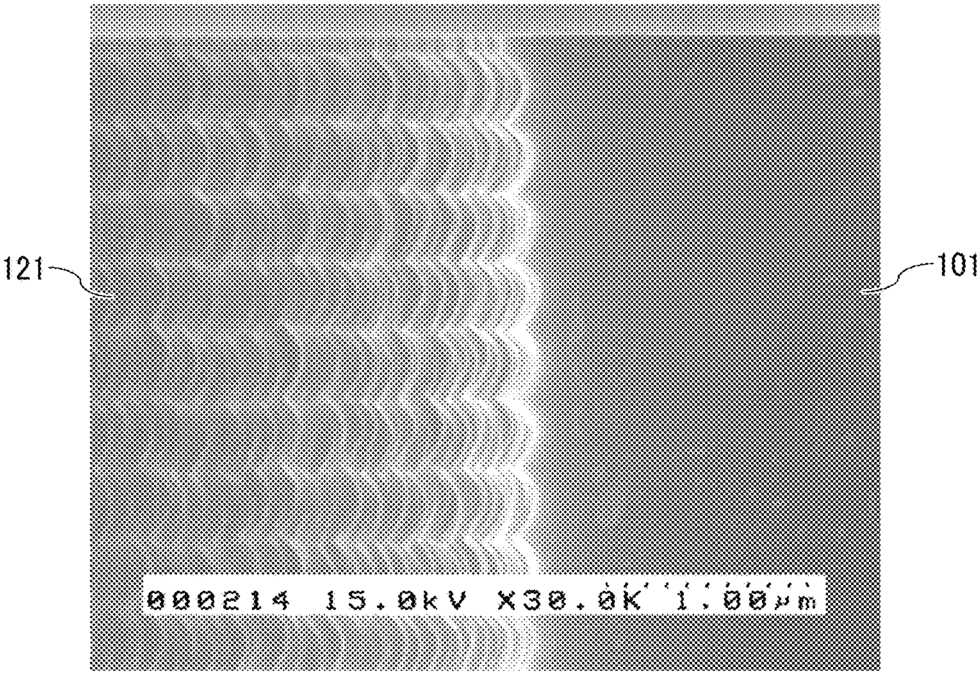
FIGS. 5A and 5B illustrate images of an internal cross section of an example of a nozzle in the present embodiment.
Figure 5B:
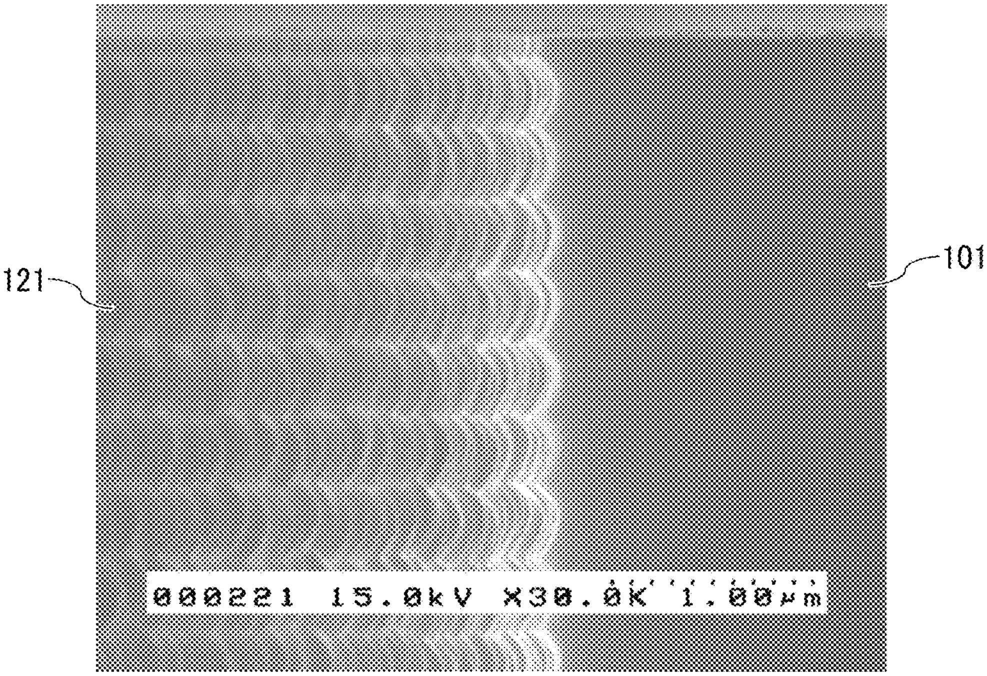

FIGS. 5A and 5B illustrate images of an internal cross section of the nozzle of the present example, and FIG. 5A is an image of a nozzle at a wafer central portion, and FIG. 5B is an image of a nozzle at a wafer outer peripheral portion. FIGS. 5A and 5B illustrate scanning electron microscope (SEM) images. As can be seen from the images, periodic projections (convex portions) and depression (concave portions) are formed on the sidewall of the cylindrical shape (cylindrical hole) configuration included in the nozzle 121. Further, the shapes are substantially the same in FIGS. 5A and 5B. Thus, as described above, uniformity of the nozzle shape can be improved in the wafer surface.

Figure 6:
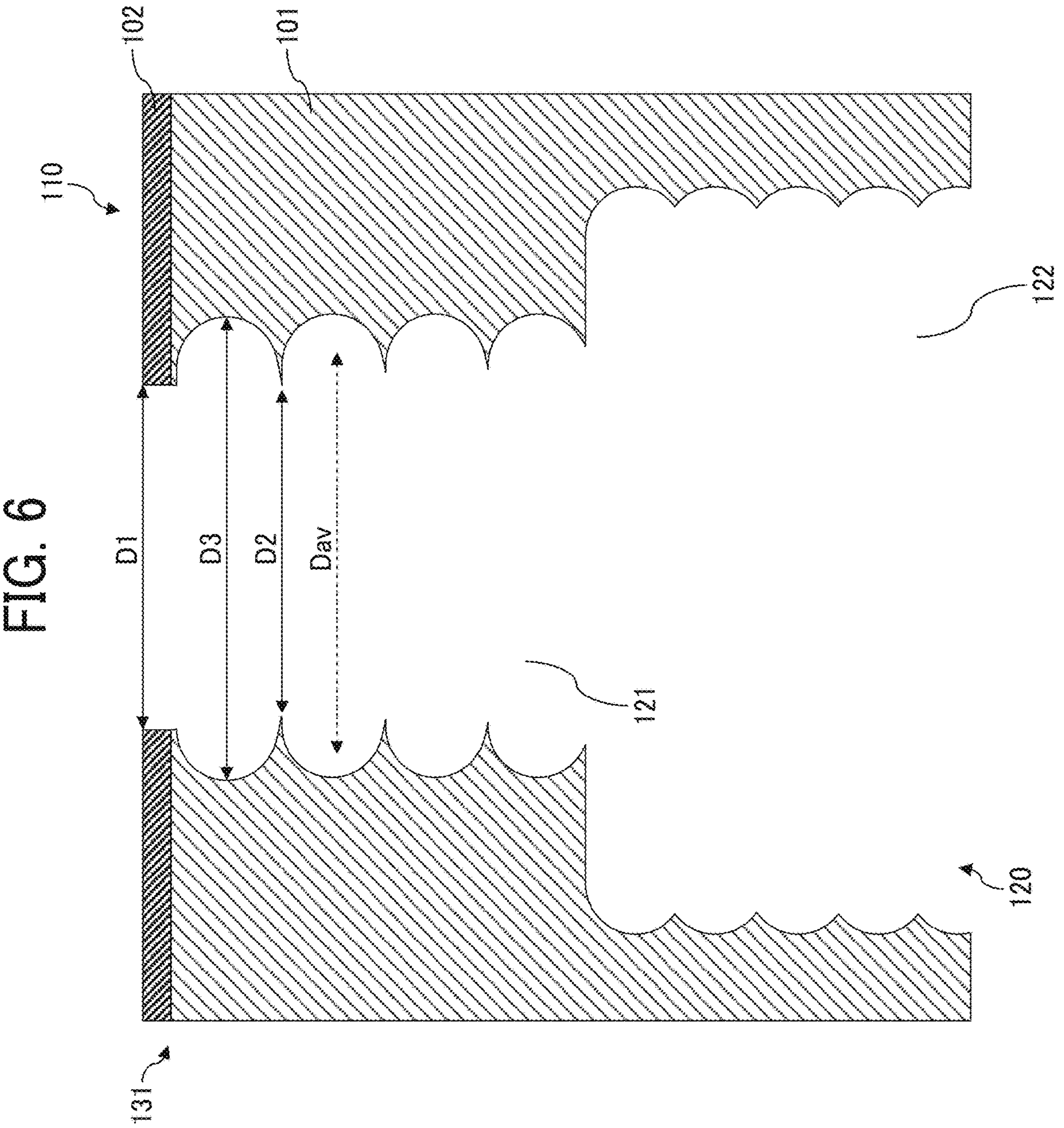
FIG. 6 is a schematic cross-sectional view of another example of the nozzle in the present embodiment.

Another example of a nozzle obtained according to the present embodiment is illustrated in FIG. 6.

In the present example, the nozzle 120 includes two cylindrical shape configurations 121 and 122 relative to a thickness direction of the nozzle plate 131. The cylindrical shape configuration on the liquid discharge surface 110 side is also referred to as a first cylindrical shape configuration 121 (first cylindrical hole 122), and the other one of the cylindrical shape configurations is also referred to as a second cylindrical shape configuration 122 (second cylindrical hole 122).

The first cylindrical shape configuration 121 is also referred to as a first cylindrical hole 122, and the second cylindrical shape configuration 122 is also referred to as a second cylindrical hole 122.

The nozzle 121 has: a first cylindrical hole (121) having a first average diameter; and a second cylindrical hole (122) disposed in an upstream of the first cylindrical hole (121) and connected in series to the first cylindrical hole (121) in the discharge direction, the second cylindrical hole (122) having a second average diameter larger than the first average diameter.

In the present example, the average diameters as described above of the two cylindrical shape configurations 121 and 122 are different from each other. That is, the average diameter as described above of the cylindrical shape configuration on the liquid discharge surface side (the first cylindrical shape configuration 121) is smaller than the average diameter as described above of the other cylindrical shape configuration (the second cylindrical shape configuration 122). Since the relationship as in the present example is satisfied, fluid resistance in the nozzle 120 can be reduced, and a degree of freedom in design of discharge waveform can be improved.

In order to form the nozzle 120 of the present example, the first cylindrical shape configuration 121 as illustrated in FIG. 4, for example, is first formed, and then before removing the resist 103 and the deposition film, the deposition film formation process and the etching process are further repeated to form the second cylindrical shape configuration 122. When the second cylindrical shape configuration 122 is formed, the order of execution of the deposition film formation process and the etching process is arbitrary. In the same way as for the above, after forming the second cylindrical shape configuration 122, the resist 103 and the deposition film are removed by the ashing treatment, for example.

FIG. 6 illustrates only D1 to D3 and Day, and the other minimum values and the maximum values are omitted from illustration. It is required that the relationship between the diameter D1 of the outermost portion of the nozzle and the average diameter Day as mentioned above be satisfied in the cylindrical shape configuration on the liquid discharge surface 110 side, in other words, the first cylindrical shape configuration 121. The above relationship need not be satisfied in the second cylindrical shape configuration 122. The same applies to a case where the nozzle further includes the other cylindrical shape configurations.

In a case where the nozzle further includes the other cylindrical shape configurations, that is, in a case where the nozzle includes a third cylindrical shape configuration on a side opposite to the liquid discharge surface side, the average diameter as described above of the second cylindrical shape configuration should preferably be smaller than the average diameter as described above of the third cylindrical shape configuration. In this case, fluid resistance in the nozzle 120 can be reduced.

Figure 7A:
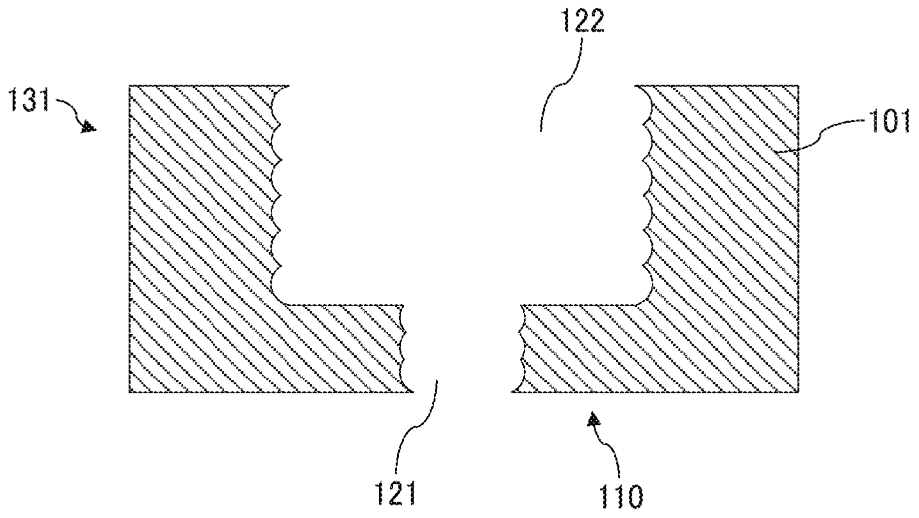
FIGS. 7A and 7B are schematic cross-sectional views of another example of the nozzle in the present embodiment.

FIG. 7A is another drawing for describing the example illustrated in FIG. 6.

Figure 7B:
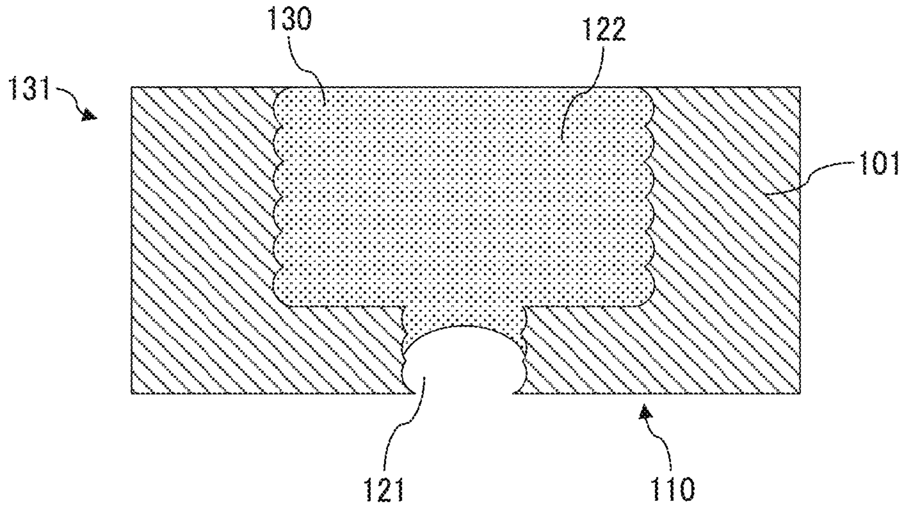

FIG. 7A illustrates the state before liquid 130 (e.g., ink) is filled, and FIG. 7B illustrates the state when the liquid 130 is filled, and the liquid 130 is to be discharged.

As for the shape of the nozzle, as in the present example, the nozzle should preferably include two cylindrical shape configurations (the first cylindrical shape configuration 121 and the second cylindrical shape configuration 122) relative to the thickness direction of the nozzle plate 131. Further, the average diameter as described above of the first cylindrical shape configuration 121 should preferably be smaller than the average diameter as described above of the second cylindrical shape configuration 122. The smaller the diameter of an outlet of the nozzle 120 is, the finer the ink droplets can be made for discharge. Thus, it is possible to improve the resolution of an image, and high-quality images can be formed.

Meanwhile, if the volume of a nozzle is small, fluid resistance increases, and a degree of freedom of discharge control is lost. Therefore, for the objective of reducing the diameter of a nozzle outlet and also lowering fluid resistance, a two-stage configuration as in the present example is desired.

During ink discharge, as illustrated in FIG. 7B, an aqueous surface of the ink is maintained at a small-diameter cylindrical portion (the first cylindrical shape configuration 121), and the position of a liquid surface fluctuates according to the pressure applied to the ink. In the comparative example, uniformity of the nozzle shape cannot be enhanced. Therefore, the position of the liquid surface varies for each nozzle even under the same pressure, and the discharge characteristics cannot be enhanced. In contrast, according to the present embodiment, it becomes easy to make the position of the liquid surface uniform among the nozzles, and the discharge characteristics can be enhanced.

Next, another embodiment is described with respect to the liquid discharge head of the present embodiment.

Figure 8:
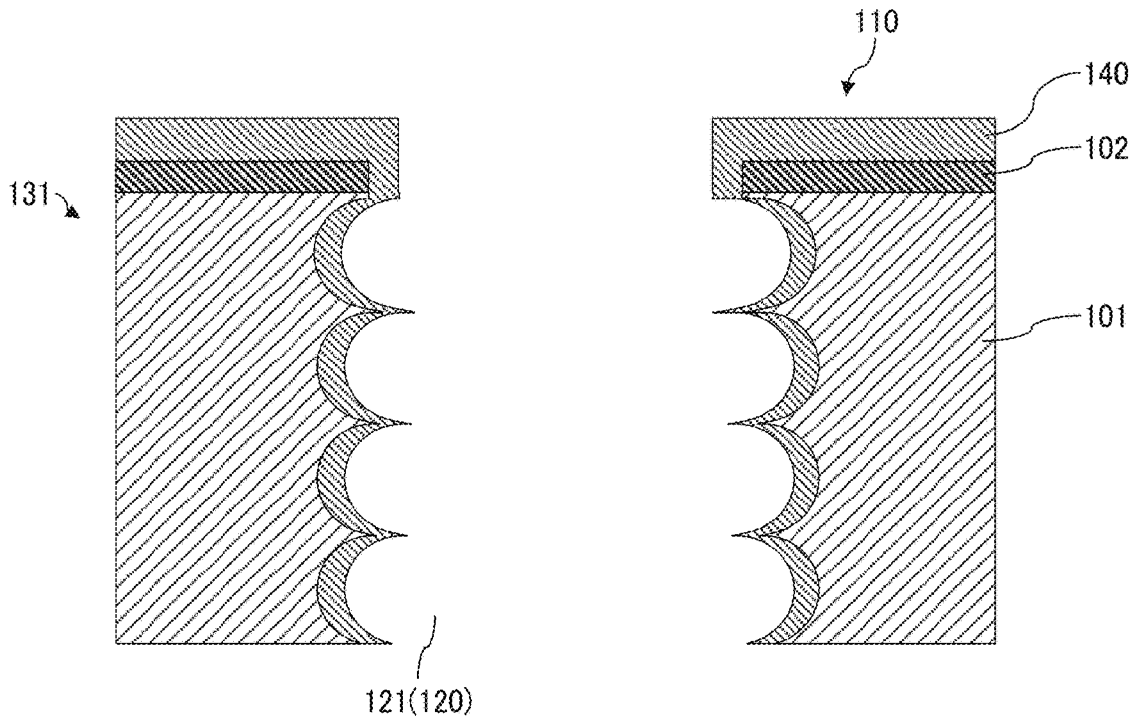
FIG. 8 is a schematic cross-sectional view of still another example of the nozzle in the present embodiment.

FIG. 8 is a schematic view for describing the liquid discharge head of the present embodiment. In the present embodiment, a protective film 140 is formed on a surface of the nozzle plate 131. Since the protective film 140 is formed, elution of Si of the Si substrate 101 to the ink can be suppressed. In particular, since the protective film 140 is formed inside the nozzle 120, elution of Si of the Si substrate 101 to the ink can further be suppressed.

A material of the protective film 140 and a method for forming the same are not particularly limited, and can be selected as appropriate. The protective film 140 of the present embodiment may be referred to as an ink-resistant protective film or the like.

When the protective film 140 is formed, whether the diameter of the outermost portion of the nozzle and the average diameter satisfy the above relationship is determined by including the protective film 140. For example, in obtaining the diameter of the nozzle outermost portion and the minimum values and the maximum values of the diameters of the cylindrical shape configuration, a distance with reference to the surface of the protective film 140 is obtained.

Next, yet another embodiment is described with respect to the liquid discharge head of the present embodiment.

Figure 9:
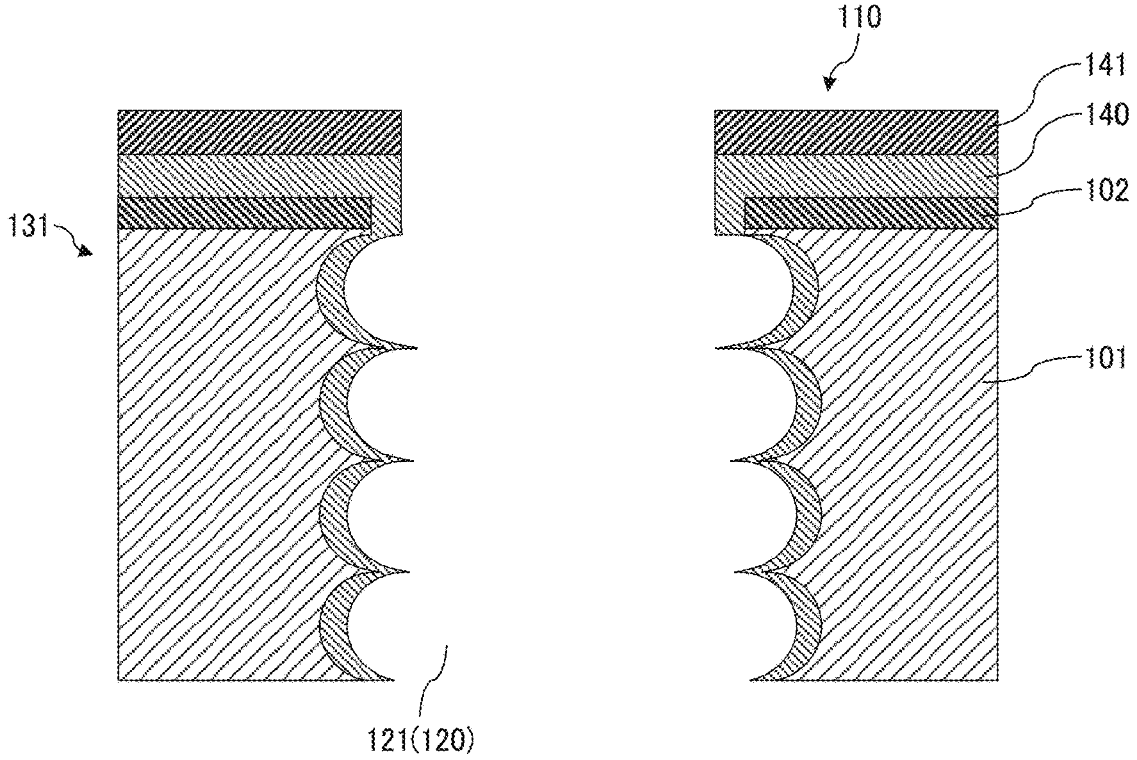
FIG. 9 is a schematic cross-sectional view of still another example of the nozzle in the present embodiment.

FIG. 9 is a schematic view for describing the liquid discharge head of the present embodiment. In the present embodiment, a water-repellent film 141 is formed on the protective film 140 of the liquid discharge surface 110. The formation of the water-repellent film 141 ensures cleanliness of the nozzle surface, and deflection of discharge droplets can further be suppressed.

A material of the water-repellent film 141 and a method for forming the same are not particularly limited, and can be selected as appropriate.

When the water-repellent film 141 is formed, whether the diameter of the outermost portion of the nozzle and the average diameter satisfy the above relationship is determined by including the water-repellent film 141. For example, in obtaining the diameter of the nozzle outermost portion, a distance with reference to the surface of the water-repellent film 141 is obtained.

Next, yet another embodiment is described with respect to the liquid discharge head of the present embodiment.

In the present embodiment, the nozzle plate includes a substrate in which one of the cylindrical shape configurations is formed, and a substrate in which another one of the cylindrical shape configurations is formed. Etch selectivity for silicon dry etching is different in the substrate in which one of the cylindrical shape configurations is formed and the substrate in which another one of the cylindrical shape configurations is formed.

Figure 10:
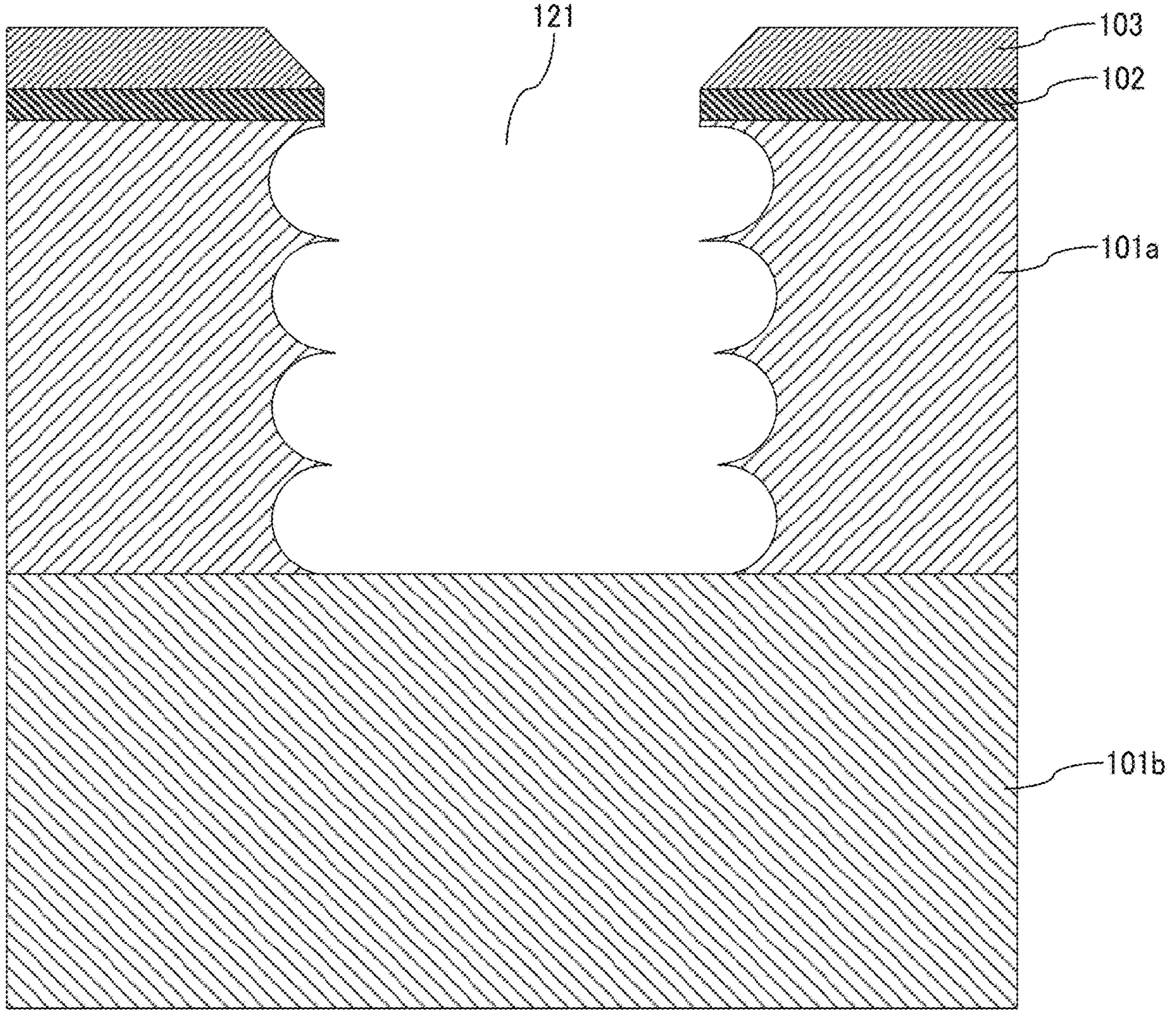
FIG. 10 is a schematic cross-sectional view of another example of the manufacturing method of the present embodiment.
Figure 11:
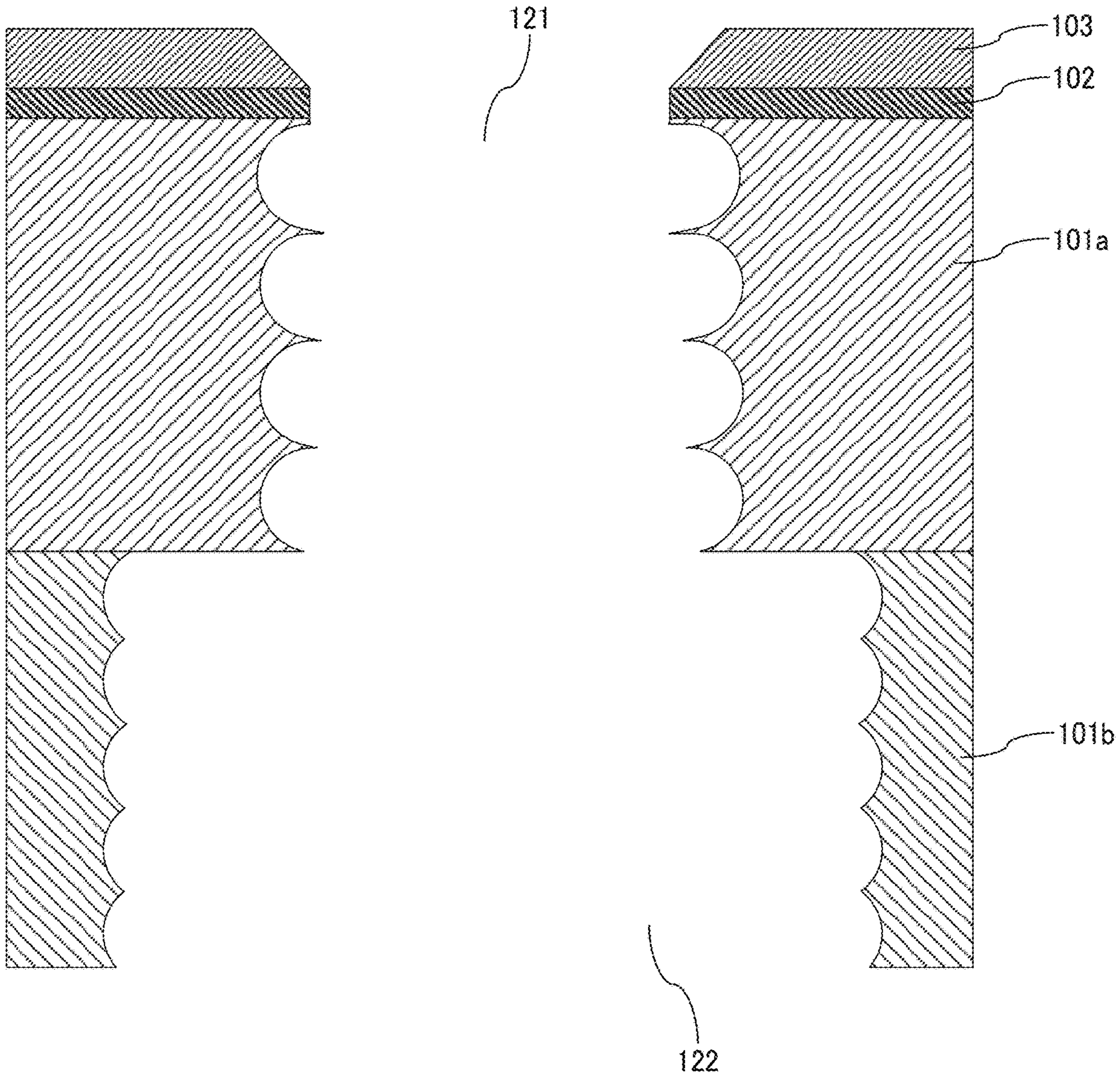
FIG. 11 is a schematic cross-sectional view of another example of the manufacturing method of the present embodiment.
Figure 12:
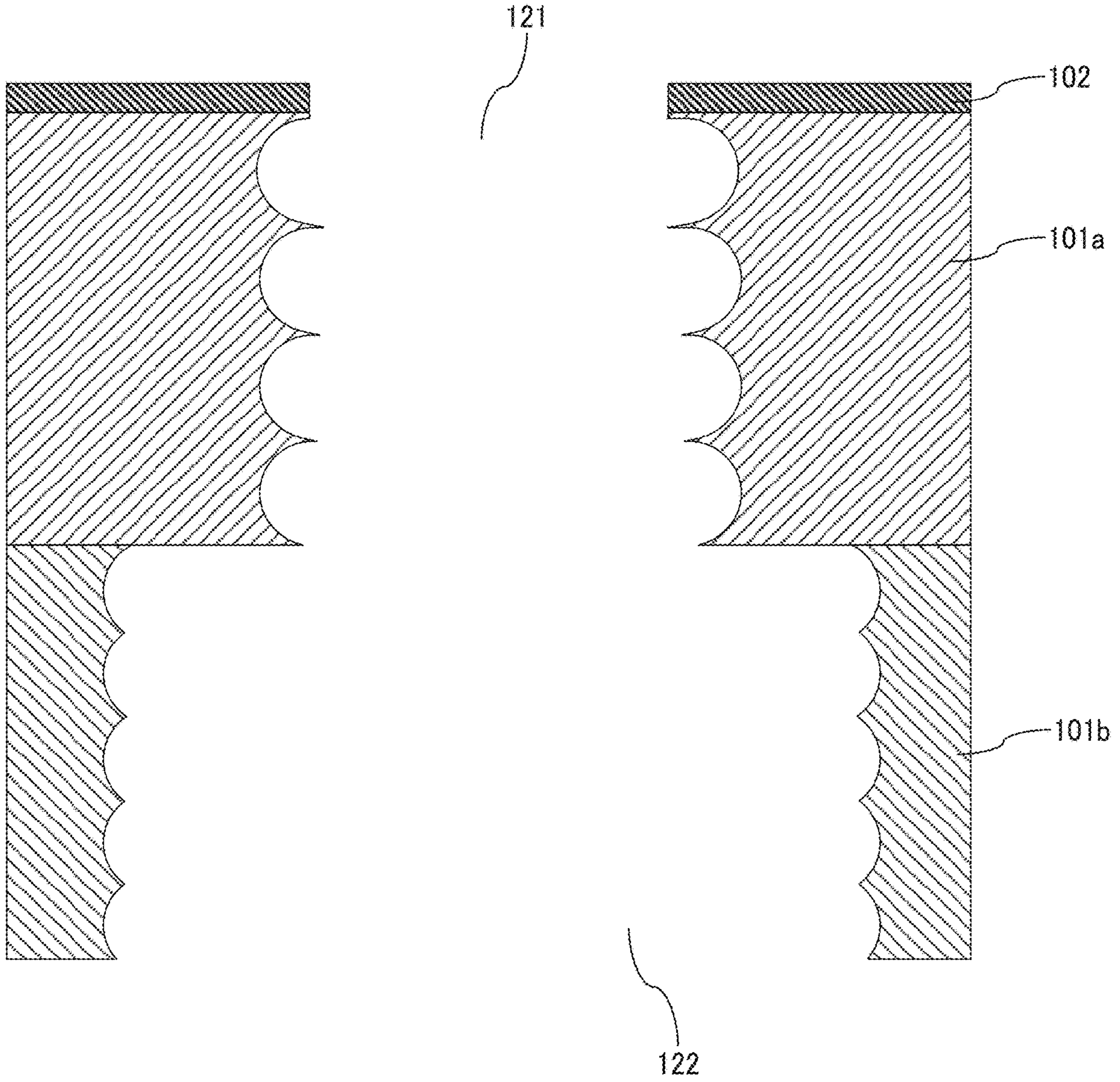
FIG. 12 is a schematic cross-sectional view of another example of the manufacturing method of the present embodiment.

Next, the present embodiment is described by referring to FIGS. 10 to 12.

FIGS. 10 and 11 are drawings for describing the process of manufacturing the liquid discharge head of the present embodiment, and FIG. 12 illustrates the liquid discharge head of the present embodiment.

FIG. 10 indicates the state in which the first cylindrical shape configuration 121 of the example illustrated in FIG. 4, for example, is formed. In the present embodiment, the first cylindrical shape configuration 121 is formed in a first Si substrate 101*a* (first substrate), and the second cylindrical shape configuration 122 is formed in a second Si substrate 101*b* (second substrate). The nozzle plate 131 of the present embodiment includes the first Si substrate 101*a* and the second Si substrate 101*b*.

Further, in the present embodiment, the etch selectivity for silicon dry etching is different in the first Si substrate 101*a* and the second Si substrate 101*b*. For example, for the second Si substrate 101*b*, a layer with high etch selectivity for silicon dry etching is used.

As illustrated in FIG. 10, in the etching process of forming the first cylindrical shape configuration 121, when the etching reaches the second Si substrate 101*b*, the etching rate is changed, and the substrate becomes hard to be etched, for example. Thus, the height of the first cylindrical shape configuration 121 can be controlled with high accuracy, and it becomes easy to form the first cylindrical shape configuration 121 in a desired shape. Although the etch selectivity is used to describe the above process, the second Si substrate 101*b*, for example, may be configured by using a layer hard to be etched as compared to the first Si substrate 101*a*.

The nozzle plate includes: a first substrate (101*a*) having the first cylindrical hole (121); and a second substrate (101*b*) having the second cylindrical hole (122), and a first etch selectivity of silicon dry etching to form the first cylindrical hole (121) in the first substrate (101*a*) is different from a second etch selectivity of silicon dry etching to form the second cylindrical hole (122) in the second substrate (101*b*).

Then, as illustrated in FIG. 11, the etching process and the deposition film formation process are repeated in the same way as for the above, and the second cylindrical shape configuration 122 is formed.

FIG. 11 indicates the state of after the second cylindrical shape configuration 122 has been formed. More specifically, FIG. 11 indicates the state of after removing the resist and the deposition film.

Then, as illustrated in FIG. 12, the resist 103 and the deposition film are removed, and the nozzle plate 131 of the present embodiment is obtained.

In the present embodiment, by varying the etch selectivity in the first Si substrate 101*a* (first substrate) and the second Si substrate 101*b* (second substrate), the shape of the nozzle can be controlled with high accuracy. Further, since the shape of the nozzle can be controlled with high accuracy, discharge control can be improved. According to the present method, the height of the first cylindrical shape configuration 121 can be made uniform among the nozzles, and the position of the liquid surface (FIG. 7B) can be made uniform among the nozzles. Thus, it becomes easy to make the positions of the liquid surfaces under a certain pressure the same among the nozzles. Also, it is possible to prevent such a disadvantage as the height of the first cylindrical shape configuration 121 being too large to cause the fluid resistance to increase.

Note that the first Si substrate 101*a* should preferably be an active layer in Silicon on Insulator (SOI) to be described later, and the second Si substrate 101*b* (second substrate) should preferably be a Box layer in the SOI to be described later.

Figure 13A:
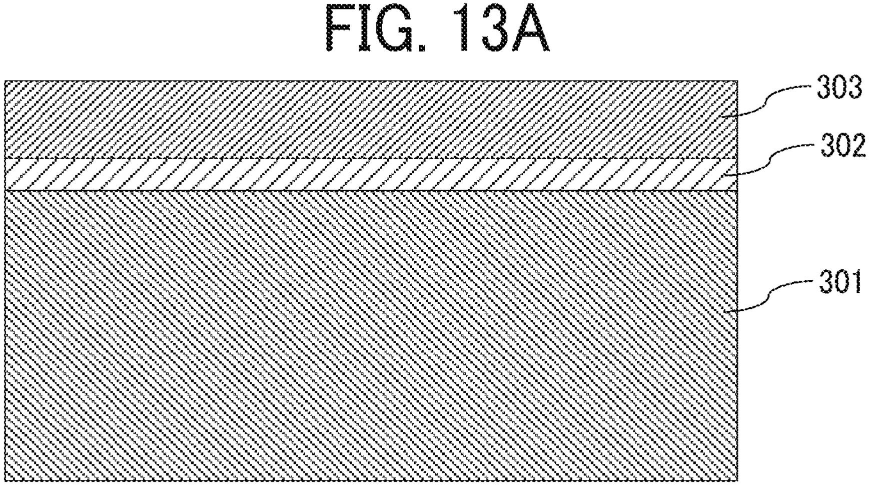
FIGS. 13A to 13C are schematic cross-sectional views of still another example of the manufacturing method of the present embodiment.
Figure 13B:
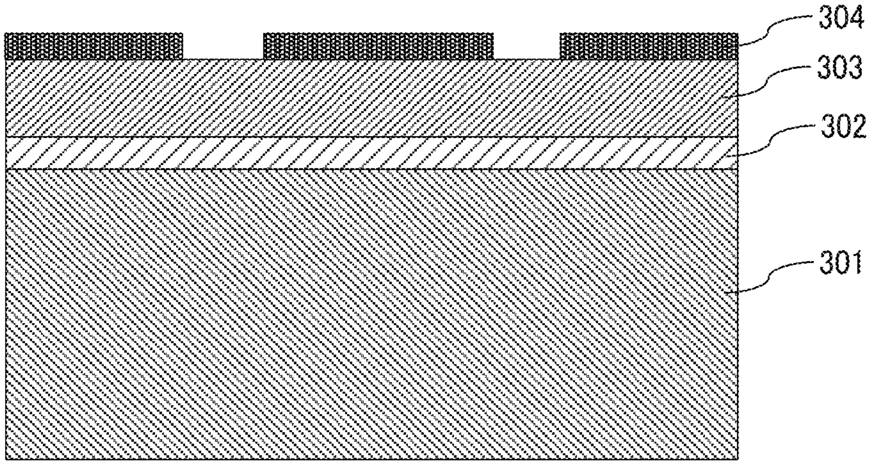
Figure 13C:
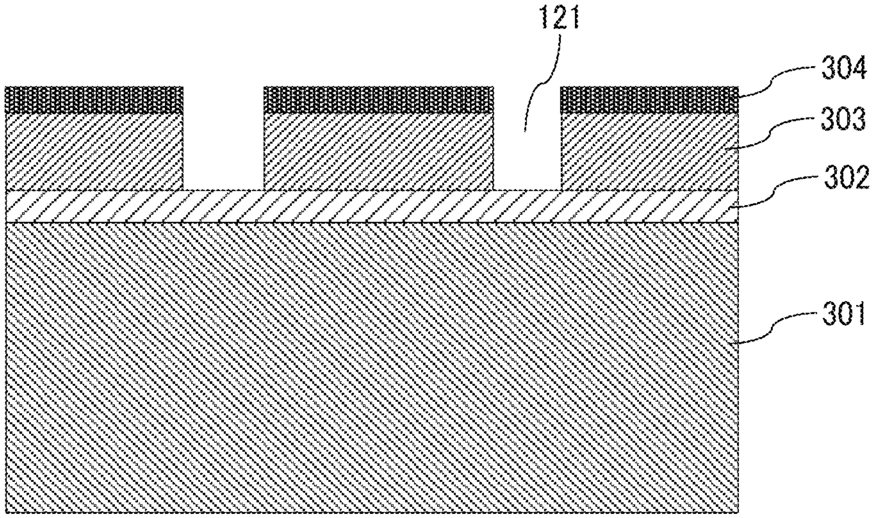

Next, yet another embodiment in the liquid discharge head of the present embodiment and a method for manufacturing the liquid discharge head are described by referring to FIGS. 13A to 13C. Formation of a liquid chamber is also described below.

In the present embodiment, Silicon on Insulator (SOI) is employed as the Si substrate. The SOI has a structure in which a Box layer ($SiO_2$) is sandwiched between an active layer (Si) and a Si substrate, and is generally used for manufacturing of LSIs. The use of the SOI in the present embodiment can improve controllability of an inkjet discharge speed. In addition, since SOI wafers are manufactured by oxidizing a surface of a Si substrate and bonding another Si substrate to one side of the oxidized Si substrate, variations in the board thickness can be suppressed to several hundreds of nanometers.

FIG. 13A depicts the SOI employed in the present embodiment. A Box layer 302 ($SiO_2$) is formed on a Si substrate 301, and an active layer 303 (Si) is formed on the Box layer 302. Illustration of a surface layer (a natural oxide film) is omitted in the drawing for simplicity.

Then, as illustrated in FIG. 13B, a first resist pattern 304 is formed on the active layer 303.

Then, as illustrated in FIG. 13C, the first cylindrical shape configuration 121 is formed by dry etching. The first cylindrical shape configuration 121 is formed by the deposition film formation process and the etching process as described above. As in the above embodiments, the deposition film formation process is performed prior to performing the initial etching process. Illustration of periodic projections and depressions is omitted in the drawing for simplicity.

The reason for performing the processing while the resist pattern is being attached is to suppress damage to an edge during the dry etching. If the edge is deformed by the etching damage, an ink discharge direction is deflected with the deformed portion being the starting point of the deflection.

Figure 14A:
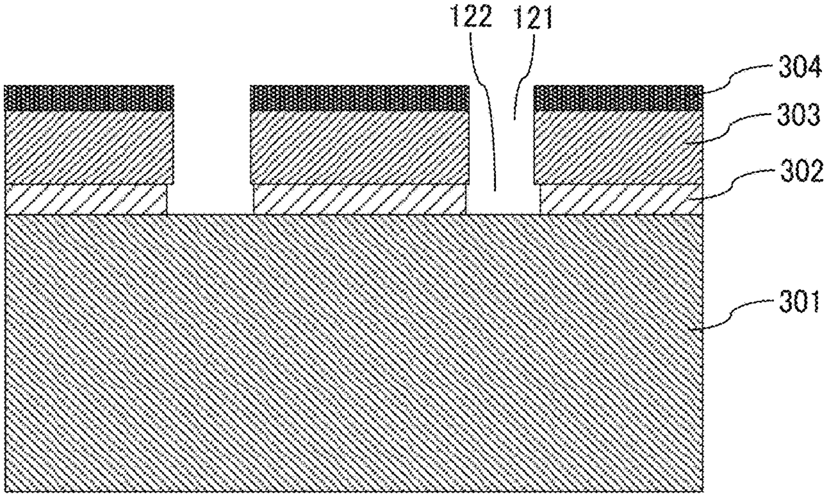
FIGS. 14A to 14C are schematic cross-sectional views of still another example of the manufacturing method of the present embodiment.

Then, as illustrated in FIG. 14A, the second cylindrical shape configuration 122 is formed. The formation method can be the same as in the above embodiments. That is, the second cylindrical shape configuration 122 is formed by the deposition film formation process and the etching process that employs, for example, dry etching. As illustrated by the drawing, the first cylindrical shape configuration 121 is formed in the active layer 303, and the second cylindrical shape configuration 122 is formed in the Box layer 302. The first cylindrical shape configuration may be referred to as a first nozzle hole, for example, and the second cylindrical shape configuration may be referred to as a second nozzle hole, for example.

Figure 14B:
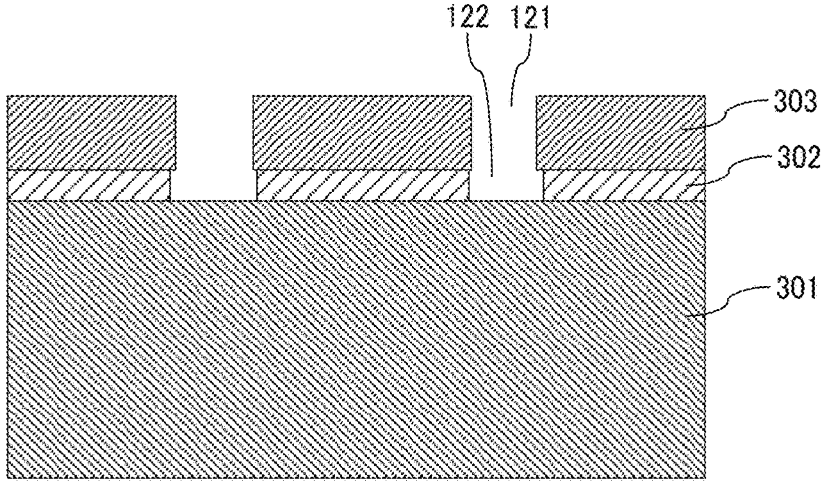

Then, as illustrated in FIG. 14B, the first resist pattern 304 is removed. Note that the timing of removing the first resist pattern 304 can be changed as appropriate as long as the timing is after the formation of the second cylindrical shape configuration 122.

Figure 14C:
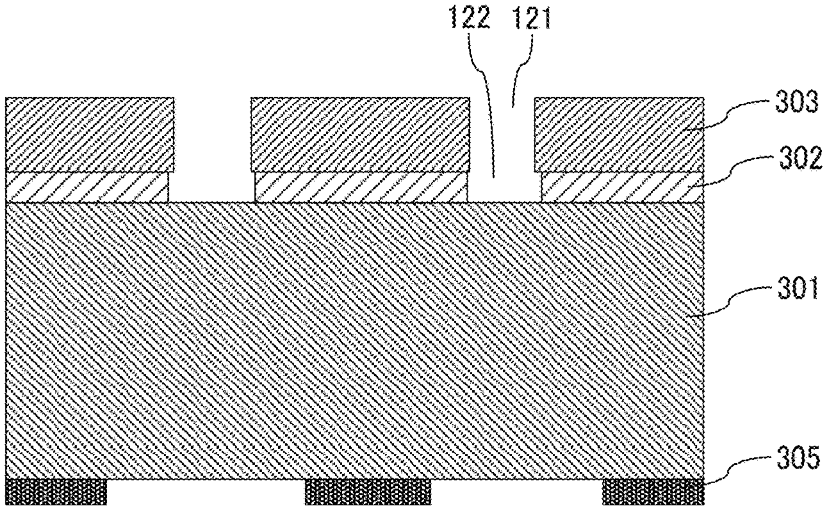

Then, as illustrated in FIG. 14C, a second resist pattern 305 is formed on the Si substrate 301.

Figure 15A:
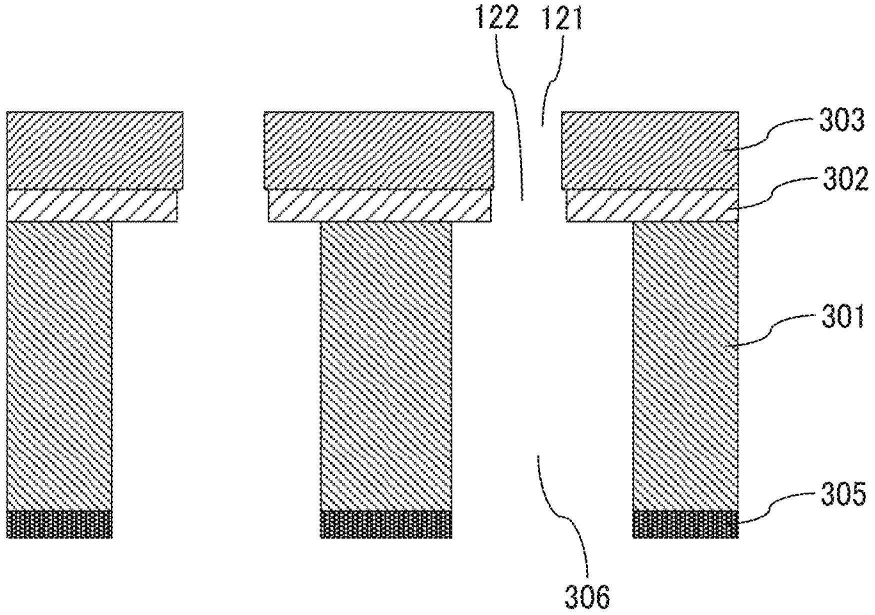
FIGS. 15A and 15B are schematic cross-sectional views of still another example of the manufacturing method of the present embodiment.

Then, as illustrated in FIG. 15A, dry etching is performed to form a liquid chamber 306 (also referred to as a pressurizing chamber, a channel liquid chamber, etc.).

Figure 15B:
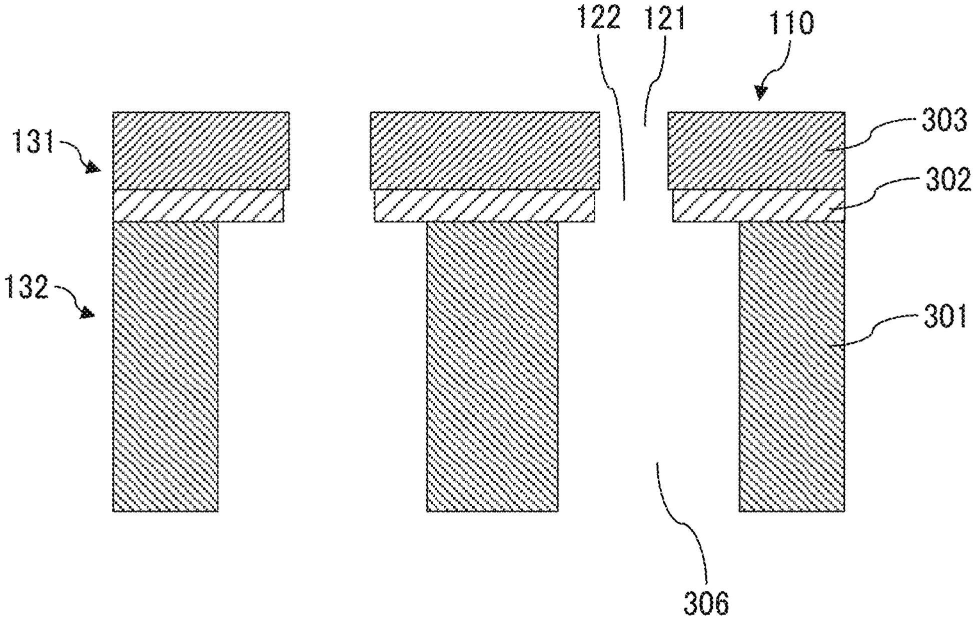

Then, as illustrated in FIG. 15B, the second resist pattern 305 is removed. Thus, the nozzle plate 131 including the nozzle of the present embodiment can be formed. The liquid discharge head of the present embodiment includes the nozzle plate 131 and a liquid chamber substrate 132. The liquid chamber substrate 132 includes the liquid chamber 306, and may be referred to as a liquid chamber plate, a channel substrate, or the like. However, the nozzle plate may also include a liquid chamber. In this case, a substrate including the elements indicated by reference numerals 131 and 132 corresponds to the nozzle plates 131 and 132. The nozzle plates 131 and 132 form one nozzle plate as a single body.

As in the example illustrated in FIG. 6, the present embodiment represents a two-stage cylindrical shape configuration perpendicular to the substrate. In other words, the nozzle includes the first cylindrical shape configuration 121 and the second cylindrical shape configuration 122.

Further, the average diameter as described above of the first cylindrical shape configuration 121 is smaller than the average diameter as described above of the second cylindrical shape configuration 122. By virtue of this feature, the diameter of an outlet of the nozzle being small enables fine ink droplets to be discharged, and it is possible to improve the resolution of an image and form high-quality images. Also, fluid resistance can be reduced.

Further, in the present embodiment, the height of the first cylindrical shape configuration 121 can be controlled with high accuracy by the use of the SOI. The reason of high accuracy control enabled in the present embodiment is that the etch selectivity for silicon dry etching is different in the active layer 303 and the Box layer 302. In the present embodiment, it is possible to suppress height variations in the first cylindrical shape configuration 121 due to excessive etching of the active layer 303.

[Liquid Discharge Apparatus and Liquid Discharge Device]

Next, an example of a liquid discharge apparatus according to the present embodiment is described with reference to FIGS. 16 and 17.

Figure 16:
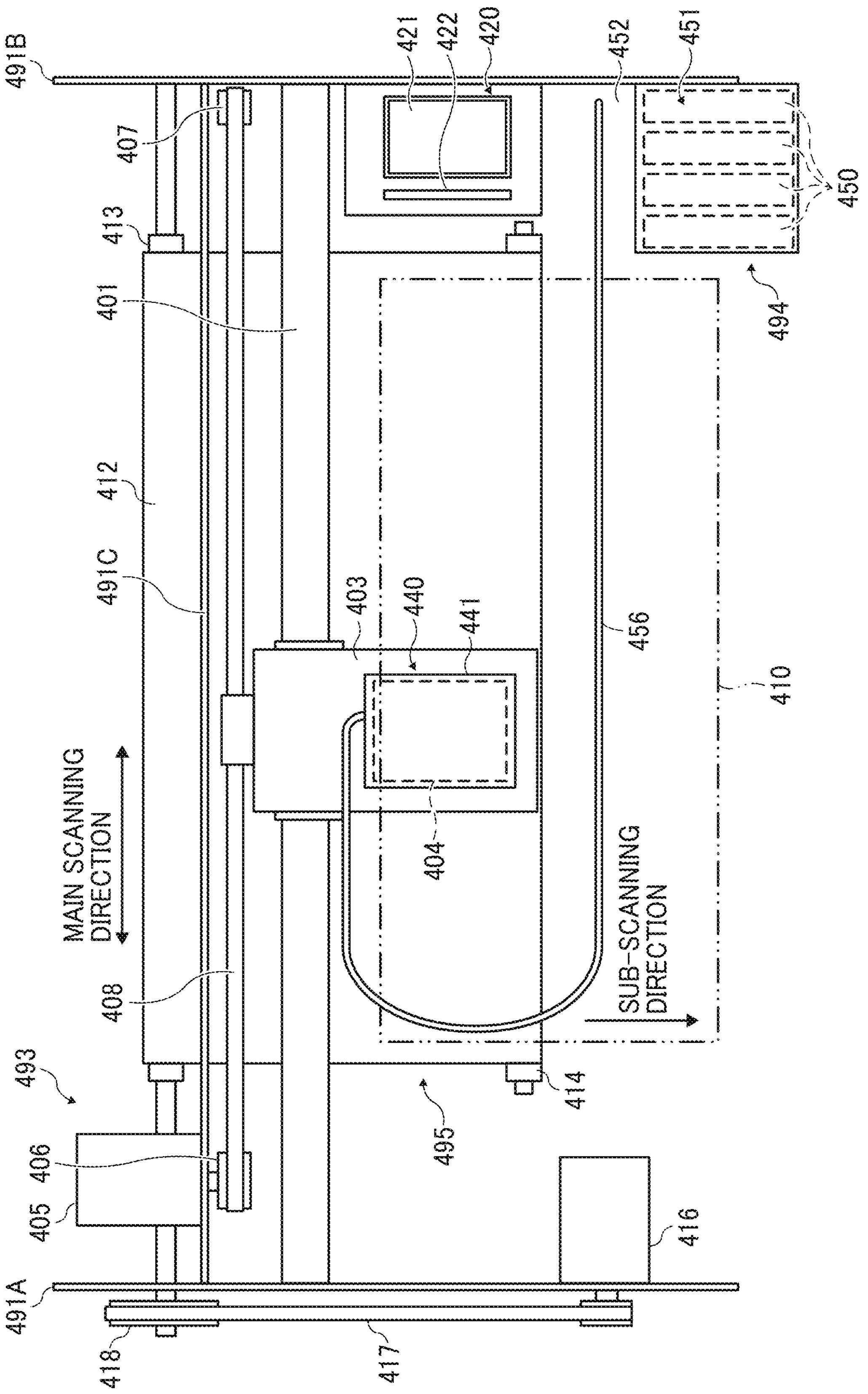
FIG. 16 is a schematic view of a liquid discharge apparatus in one example.

FIG. 16 is a plan view for describing the essential parts of the apparatus.

Figure 17:
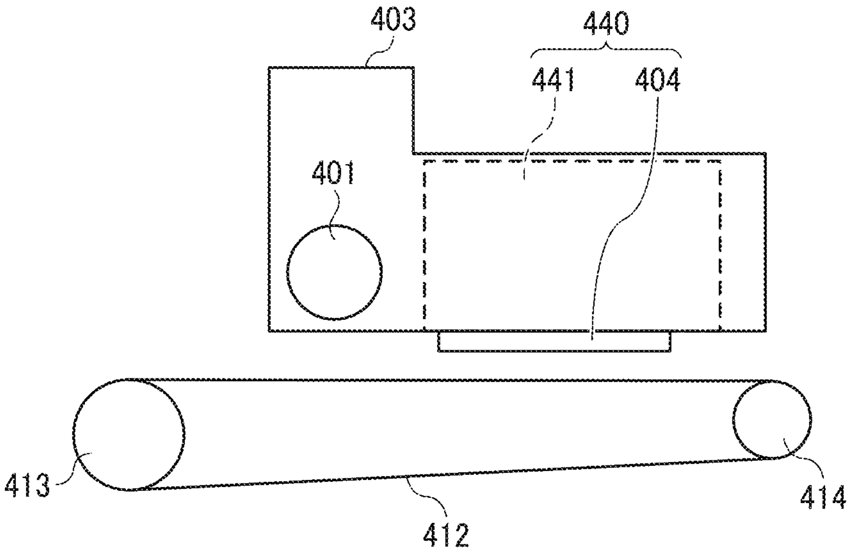
FIG. 17 is a schematic view of the liquid discharge apparatus in another example.

FIG. 17 is a side view for describing the essential parts of the apparatus.

This apparatus is a serial type apparatus, and a carriage 403 makes a reciprocating movement in a main scanning direction by a main scan moving unit 493. The main scan moving unit 493 includes a guide 401, a main scan motor 405, a timing belt 408, and the like.

The guide 401 is bridged between a left-side plate 491A and a right-side plate 491B to moveably hold the carriage 403.

The main scan motor 405 causes the carriage 403 to make a reciprocating movement in the main scanning direction via a timing belt 408 bridged between a driving pulley 406 and a driven pulley 407.

A liquid discharge device 440 in which a liquid discharge head 404 and a head tank 441 according to the present embodiment are integrated is mounted in the carriage 403. The liquid discharge head 404 of the liquid discharge device 440 discharges liquid of each color, for example, yellow (Y), cyan (C), magenta (M), and black (K). The liquid discharge head 404 includes a nozzle array including a plurality of nozzles 120 (121) arrayed in a row in a sub-scanning direction perpendicular to the main scanning direction. The liquid discharge head 404 is mounted to the carriage 403 so that ink droplets are discharged downward.

Liquids stored in liquid cartridges 450 are supplied to the head tank 441 by a supply unit 494 to supply the liquid stored outside the liquid discharge head 404 to the liquid discharge head 404.

The supply unit 494 includes a cartridge holder 451 serving as a filling part to mount the liquid cartridges 450, a tube 456, a liquid feeder 452 including a liquid feed pump, and the like. Each of the liquid cartridges 450 is removably mounted in the cartridge holder 451. The liquid is fed from the liquid cartridge 450 to the head tank 441 by the liquid feeder 452 via the tube 456.

The liquid discharge apparatus includes a conveyor 495 to convey a sheet 410. The conveyor 495 includes a conveyance belt 412 as a conveyor unit, and a sub scan motor 416 to drive the conveyance belt 412.

The conveyance belt 412 attracts the sheet 410 and conveys the sheet 410 at a position facing the liquid discharge head 404. The conveyance belt 412 is an endless belt and is stretched between a conveyance roller 413 and a tension roller 414. The attraction of the sheet 410 to the conveyance belt 412 may be executed by electrostatic adsorption, air suction, or the like.

The conveyance belt 412 rotates in the sub-scanning direction as the conveyance roller 413 is rotationally driven by the sub scan motor 416 via a timing belt 417 and a timing pulley 418.

At one side in the main scanning direction of the carriage 403, a maintenance unit 420 to maintain the liquid discharge head 404 in good condition is disposed on a lateral side of the conveyance belt 412.

The maintenance unit 420 includes, for example, a cap 421 to cap a nozzle surface of the liquid discharge head 404, a wiper 422 to wipe the nozzle surface, and the like. The nozzle surface is an outer surface of a nozzle substrate on which the nozzles are formed.

The main scan moving unit 493, the supply unit 494, the maintenance unit 420, and the conveyor 495 are mounted to a housing that includes the left-side plate 491A, the right-side plate 491B, and a rear-side plate 491C.

In the liquid discharge apparatus thus configured, the sheet 410 is conveyed on and attracted to the conveyance belt 412, and is conveyed in the sub-scanning direction by the cyclic rotation of the conveyance belt 412.

The liquid discharge head 404 is driven, in response to image signals while moving the carriage 403 in the main scanning direction, to discharge a liquid to the sheet 410 stopped, thus forming an image on the sheet 410.

As described above, since the liquid discharge apparatus is provided with the liquid discharge head according to the present embodiment, high-quality images can be stably formed.

Next, another example of the liquid discharge device according to the present embodiment is described with reference to FIG. 18.

Figure 18:
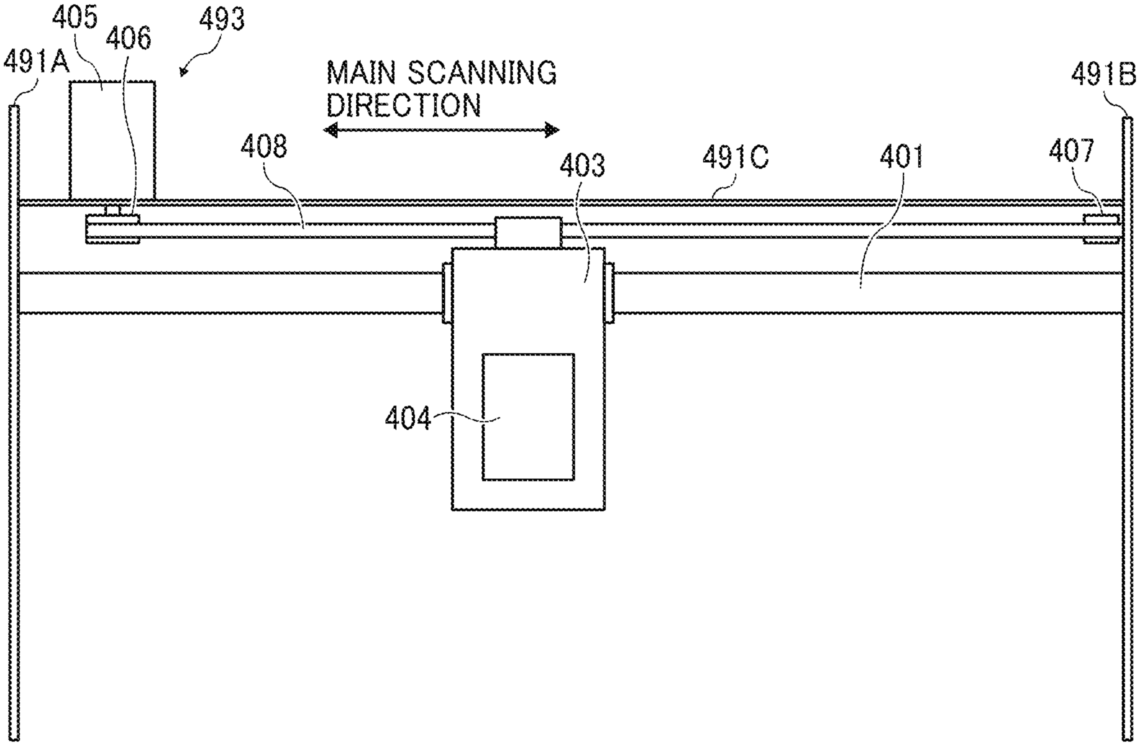
FIG. 18 is a schematic view of a liquid discharge device in one example.

FIG. 18 is a plan view for describing the essential parts of the device.

The liquid discharge device 440 includes a housing part, the main scan moving unit 493, the carriage 403, and the liquid discharge head 404, among components of the liquid discharge apparatus. The left-side plate 491A, the right-side plate 491B, and the rear-side plate 491C configure the housing part.

The liquid discharge device 440 may be configured to further have at least one of the above-described maintenance unit 420 and the supply unit 494 attached to, for example, the right-side plate 491B of the liquid discharge device 440.

Figure 19:
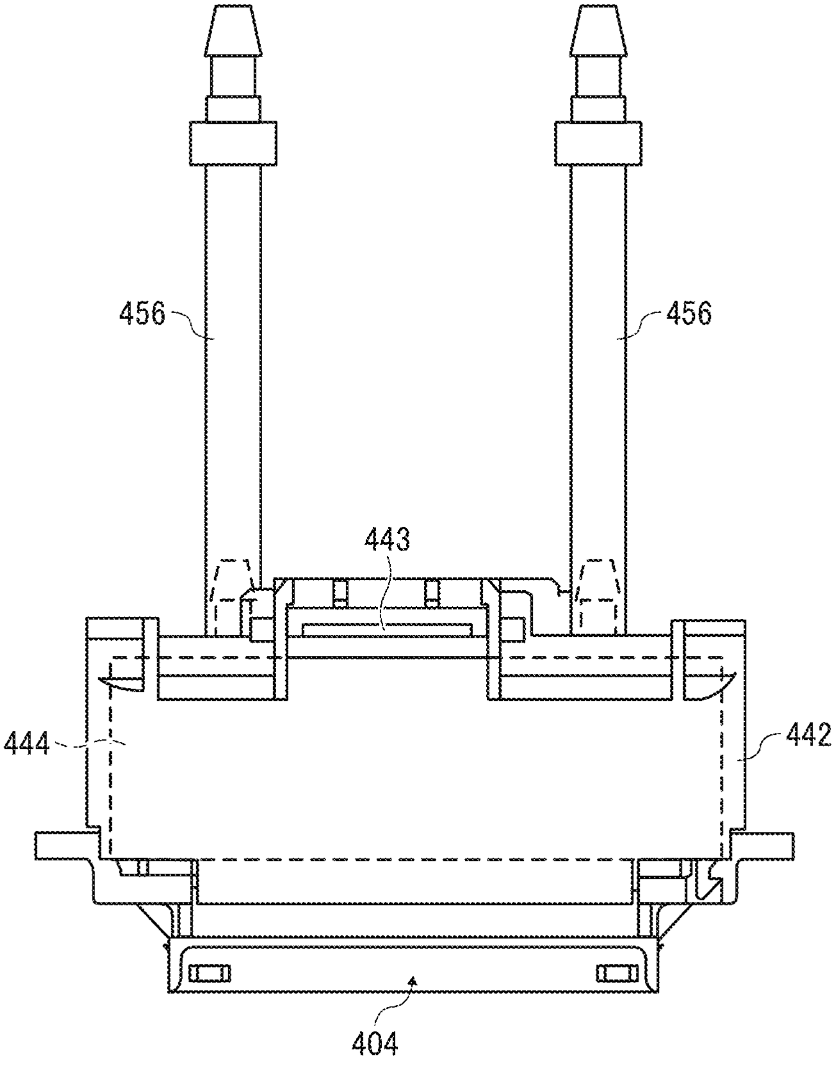
FIG. 19 is a schematic view of a liquid discharge device in another example.

Next, yet another example of the liquid discharge device according to the present embodiment is described with reference to FIG. 19. FIG. 19 is a front view for describing the device.

The liquid discharge device 440 includes the liquid discharge head 404 to which a channel part 444 is mounted, and a tube 456 connected to the channel part 444.

Further, the channel part 444 is disposed inside a cover 442. Instead of the channel part 444, the liquid discharge device 440 may include the head tank 441. A connector 443 electrically connected with the liquid discharge head 404 is provided on an upper part of the channel part 444.

In the above-described embodiments, the "liquid discharge apparatus" includes the liquid discharge head or the liquid discharge device, and drives the liquid discharge head to discharge a liquid. The liquid discharge apparatus includes, for example, not only an apparatus capable of discharging liquid to a material onto which liquid can adhere, but also an apparatus to discharge liquid toward gas or into liquid.

The "liquid discharge apparatus" may include units to feed, convey, and eject the material onto which liquid can adhere. The liquid discharge apparatus may further include a pretreatment apparatus to coat the material with a treatment liquid, and a post-treatment apparatus to coat the material, onto which the liquid has been discharged, with a treatment liquid.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns that do not have meaning, or fabricate three-dimensional images.

The above-described term "material onto which liquid can adhere" represents a material to which liquid can at least temporarily adhere, a material to which liquid adheres and is fixed, or a material to which liquid adheres and is permeated. Examples of the "material onto which liquid can adhere" include recording media, such as a paper sheet, recording paper, a recording sheet of paper, a film, and cloth; electronic components, such as an electronic substrate and a piezoelectric element; and media, such as a powder layer, an organ model, and a testing cell. That is, the "material onto which liquid can adhere" includes any material on which liquid can adhere, unless particularly limited.

Examples of the "material onto which liquid can adhere" include any materials on which liquid can adhere even temporarily, such as paper, thread, fiber, fabric, leather, metal, plastic, glass, wood, ceramic, construction materials (e.g., wallpaper or floor material), and a clothing textile.

Examples of the "liquid" are, e.g., ink, a treatment liquid, a DNA sample, a resist, a pattern material, a binder, a fabrication liquid, or solution and dispersion liquid including amino acid, protein, or calcium.

The "liquid discharge apparatus" may be an apparatus to relatively move the liquid discharge head and the material onto which liquid can adhere. However, the liquid discharge apparatus is not limited to such an apparatus. For example, the liquid discharge apparatus may either be a serial type apparatus that moves the liquid discharge head or a line type apparatus that does not move the liquid discharge head.

Examples of the "liquid discharge apparatus" further include a treatment liquid coating apparatus to discharge a treatment liquid to a sheet surface in order to coat the sheet with the treatment liquid to reform the sheet surface, and an injection granulation apparatus to discharge a composition liquid including a raw material dispersed in a solution from a nozzle to mold particles of the raw material.

The "liquid discharge device" is an assembly of parts relating to liquid discharge. More specifically, the "liquid discharge device" represents a structure including a functional part(s) or mechanism combined to the liquid discharge head to form a single unit. For example, the "liquid discharge device" includes a combination of the liquid discharge head with at least one of the head tank, the carriage, the supply unit, the maintenance unit, and the main scan moving unit so that a single unit is formed.

Here, examples of the "single unit" include a combination in which the liquid discharge head and a functional part(s) or unit(s) are secured to each other through, e.g., fastening, bonding, or engaging, and a combination in which one of the liquid discharge head and the functional part(s) or unit(s) is movably held relative to the other. The liquid discharge head may be detachably attached to the functional part(s) or unit(s), so that the liquid discharge head and the functional part(s) or unit(s) are detachable from each other.

For example, as the liquid discharge device, the device may include a liquid discharge head and a head tank that are combined to form a single unit, as in the liquid discharge device 440 illustrated in FIG. 17.

The liquid discharge head and the head tank may be connected to each other via, e.g., a tube to integrally form the liquid discharge device. A unit including a filter may be added at a position between the head tank and the liquid discharge head of the liquid discharge device.

In another example, the liquid discharge head and the carriage may form the liquid discharge device as a single unit.

In yet another example, the liquid discharge device includes the liquid discharge head movably held by a guide that forms part of a main scan moving unit. Thus, the liquid discharge head and the main scan moving unit form a single unit. As in the liquid discharge device 440 illustrated in FIG. 18, the liquid discharge head, the carriage, and the main scan moving unit may be combined as a single unit to form the liquid discharge device.

In yet another example, a cap that forms a part of the maintenance unit may be secured to the carriage mounting the liquid discharge head. Thus, the liquid discharge head, the carriage, and the maintenance unit that are formed as a single unit form the liquid discharge device.

As in the liquid discharge device 440 illustrated in FIG. 19, a tube may be connected to a liquid discharge head mounting a head tank or a channel part. The liquid discharge head and a supply unit are thus combined as a single unit to form the liquid discharge device.

The main scan moving unit may be formed of a guide alone. The supply unit may be formed of a tube(s) alone or a loading unit alone.

The type of a pressure generator used in the “liquid discharge head” is not particularly limited. The pressure generator is not limited to a piezoelectric actuator (or a laminated-type piezoelectric element) described in the above embodiments, and may be, for example, a thermal actuator that employs a thermoelectric transducer element such as a thermal resistor, or an electrostatic actuator including a diaphragm and opposed electrodes.

The terms “image formation”, “recording”, “character printing”, “image printing”, “printing” and “fabrication” used herein may be used synonymously with each other.

EXAMPLES

Examples are given below to further describe the present embodiments specifically. However, the present embodiments are not limited by the following examples.

Example 1 and Comparative Example 1

In Example 1, SOI was employed, and a liquid discharge head was formed as illustrated in FIGS. 13 (13A to 13C) to 15 (15A to 15C). In Example 1, a deposition film formation process was performed prior to performing an initial etching process (refer to FIG. 1A to 1C). Further, a nozzle including two cylindrical shape configurations was formed.

In comparative example 1, a liquid discharge head was formed by employing SOI as in Example 1. However, an initial etching process was performed prior to performing a deposition film formation process (refer to FIG. 20A).

Next, the following evaluations were made on the liquid discharge heads obtained as described above.

For each of the above liquid discharge heads, the diameter of a nozzle outermost portion was obtained for 20,000 nozzles. Then, from the obtained results, a hole diameter distribution of the diameters was obtained, and from the obtained hole diameter distribution, a standard deviation 3σ was obtained to make the evaluations. The smaller the value of the standard deviation 3σ is, the more it can be considered that the diameters of the nozzle outermost portions are uniform.

As the evaluation criterion, the value of 3σ being below 0.1 μm was assumed.

To obtain the diameters of the outermost portions of the nozzles, the dimensions were optically measured by NEXIV™ optical length measuring machine manufactured by Nikon Solutions Co., ltd. A condition in which a dimensional measurement error is within 0.02 μm was used. An optical automatic measuring instrument, which acquires an image of the nozzle outermost portion, and performs dimensional measurement for the image by image processing, was used to obtain the diameters of the outermost portions of the nozzles.

A minimum value and a maximum value of the diameters of the cylindrical shape configuration were obtained by acquiring an SEM image of a cross section of the nozzle, and measuring the diameter of a sidewall by SEM observation. The points of measurement of the minimum value and the maximum value, in other words, the number of points where the minimum value and the maximum value were obtained, were set to 30 or so per nozzle.

Table 1 presents a measurement result and an evaluation result.

Table 1 indicates the values of the following obtained for one nozzle which is positioned at a center within wafer, and another nozzle which is positioned at an outer periphery within wafer: a diameter of the nozzle outermost portion; an average diameter of the cylindrical shape configuration; an average diameter of the maximum values of the diameters of the cylindrical shape configuration; and an average diameter of the minimum values of the diameters of the cylindrical shape configuration. In Table 1, the average diameter of the cylindrical shape configuration is a value obtained by adding the average diameter of the maximum values of the cylindrical shape configuration and the average diameter of the minimum values of the diameters of the cylindrical shape configuration, and dividing the sum of the average diameters by two.

As indicated in Table 1, in Example 1, the nozzle at a wafer central portion and the nozzle at a wafer outer peripheral portion are both nozzles in which the diameter of the nozzle outermost portion is smaller than the average diameter of the maximum values and the minimum values of the diameters of the cylindrical shape configuration. The measurement values indicated in Table 1 are the values of the nozzle at the wafer central portion and the other nozzle at the wafer outer peripheral portion. However, in Example 1, similarly for the other nozzles, the diameter of the nozzle outermost portion was smaller than the average diameter of the maximum values and the minimum values of the diameters of the cylindrical shape configuration.

In contrast, in Comparative Example 1, a nozzle at a wafer central portion and a nozzle at a wafer outer peripheral portion are both nozzles in which the diameter of a nozzle outermost portion is larger than the average diameter of maximum values and minimum values of the diameters of a cylindrical shape configuration. Also in Comparative Example 1, similarly for the other nozzles of Comparative Example 1, the diameter of the nozzle outermost portion was larger than the average diameter of the maximum values and the minimum values of the diameters of the cylindrical shape configuration.

A sidewall of the cylindrical shape configuration had periodic projections and depressions as indicated in FIGS. 5A and 5B, in both of Example 1 and Comparative Example 1.

In addition, in Example 1 as indicated in Table 1, the standard deviation 3σ obtained from a diameter distribution of the nozzle outermost portion was 0.085 μm, which means that the standard deviation 3σ was below the criterion value of 0.1 μm. Accordingly, in Example 1, it can be considered that diameter uniformity at the nozzle outermost portion is high.

In contrast, in Comparative Example 1, the standard deviation 3σ was 0.142 μm, which means that the standard deviation 3σ was above the criterion value of 0.1 μm. Accordingly, in Comparative Example 1, it can be considered that diameter uniformity at the nozzle outermost portion is low.

As can be seen, by making the diameter of the nozzle outermost portion smaller than the average diameter of the maximum values and the minimum values of the diameters of the cylindrical shape configuration, it is possible to improve the diameter uniformity at the nozzle outermost portion in a wafer surface or a nozzle plate.

TABLE 1

| | Value obtained for nozzle at one point | | | | | |
|---|---|---|---|---|---|---|
| | Position within wafer | Outermost portion diameter [μm] | Average diameter of cylindrical shape configuration [μm] | Average diameter of maximum values of diameters of cylindrical shape configuration [μm] | Average diameter of minimum values of diameters of cylindrical shape configuration [μm] | All nozzles Outermost portion diameter 3σ [μm] |
| Example 1 | Center | 25.03 | 25.04 | 25.07 | 25.01 | 0.085 |
| | Periphery | 24.96 | 24.98 | 25.01 | 24.95 | |
| Comparative | Center | 25.09 | 25.07 | 25.10 | 25.05 | 0.142 |
| Example 1 | Periphery | 24.96 | 24.95 | 24.98 | 24.92 | |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A liquid discharge head comprising:

a nozzle plate having a nozzle from which a liquid is to be discharged in a discharge direction, the nozzle having a cylindrical hole having periodical convex portions and concave portions on a sidewall of the nozzle in the discharge direction, a diameter of an outermost portion of the nozzle in the discharge direction being smaller than an average diameter of minimum values and maximum values of diameters of the cylindrical hole, wherein the average diameter is obtained by:

Average diameter=(Sum of minimum values+Sum of maximum values)/(Count of minimum values+Count of maximum values).

2. The liquid discharge head according to claim 1, wherein the nozzle has:

a first cylindrical hole having a first average diameter; and a second cylindrical hole disposed in an upstream of the first cylindrical hole and connected in series to the first cylindrical hole in the discharge direction, the second cylindrical hole having a second average diameter larger than the first average diameter.

3. The liquid discharge head according to claim 2, wherein:

the nozzle plate comprises:

a first substrate having the first cylindrical hole; and a second substrate having the second cylindrical hole, wherein a first etch selectivity of silicon dry etching to form the first cylindrical hole in the first substrate is different from a second etch selectivity of silicon dry etching to form the second cylindrical hole in the second substrate.

4. The liquid discharge head according to claim 1, wherein a protective film is on a surface of the nozzle plate.

5. The liquid discharge head according to claim 4, wherein a water-repellent film is on the protective film.

6. A liquid discharge device comprising the liquid discharge head according to claim 1.

7. The liquid discharge device according to claim 6, further comprising:

at least one of:

a head tank configured to store a liquid to be supplied to the liquid discharge head;

a carriage mounting the liquid discharge head;

a supply unit configured to supply the liquid to the liquid discharge head;

a maintenance unit configured to maintain the liquid discharge head; and a main scan moving unit configured to move the liquid discharge head in a main scanning direction, combined with the liquid discharge head to form a single unit.

8. A liquid discharge apparatus comprising the liquid discharge device according to claim 6.

9. A method for manufacturing a liquid discharge head configured to discharge a liquid from a nozzle in a discharge direction, the method comprising:

forming a deposition film on a substrate, the deposition film configured to protect the substrate;

etching the substrate and the deposition film formed on the substrate after forming the deposition film; and repeating the forming and the etching to form a cylindrical hole having periodical convex portions and concave portions on a sidewall of the cylindrical hole in the discharge direction.

10. The method according to claim 9, wherein a diameter of an outermost portion of the nozzle in the discharge direction is smaller than an average diameter of minimum values and maximum values of diameters of the cylindrical hole, and the average diameter is obtained by:

Average diameter=(Sum of minimum values+Sum of maximum values)/(Count of minimum values+Count of maximum values).

* * * * *